US012028878B2

(12) United States Patent
Jin et al.

(10) Patent No.: US 12,028,878 B2
(45) Date of Patent: Jul. 2, 2024

(54) METHOD AND APPARATUS FOR ALLOCATING GPU TO SOFTWARE PACKAGE

(71) Applicant: Samsung Electronics Co., Ltd., Suwon-si (KR)

(72) Inventors: Cheolgyu Jin, Suwon-si (KR); Changbae Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 270 days.

(21) Appl. No.: 17/572,973

(22) Filed: Jan. 11, 2022

(65) Prior Publication Data

US 2022/0150898 A1    May 12, 2022

Related U.S. Application Data

(63) Continuation of application No. PCT/KR2021/016467, filed on Nov. 11, 2021.

(30) Foreign Application Priority Data

Nov. 12, 2020  (KR) .................. 10-2020-0151325

(51) Int. Cl.
   *H04W 72/52*    (2023.01)
   *H04W 72/044*   (2023.01)
   (Continued)

(52) U.S. Cl.
   CPC ....... *H04W 72/52* (2023.01); *H04W 72/0473* (2013.01); *H04W 72/121* (2013.01); *H04W 72/23* (2023.01)

(58) Field of Classification Search
   None
   See application file for complete search history.

(56) References Cited

U.S. PATENT DOCUMENTS 8,522,243 B2 * 8/2013 Ventroux ............ G06F 9/5038
                                                    718/103
9,323,577 B2 * 4/2016 Marr .................. H04L 41/0806
(Continued)

FOREIGN PATENT DOCUMENTS

CN        111078356 A      4/2020
CN        111796932 A     10/2020
(Continued)

OTHER PUBLICATIONS

International Search Report dated Feb. 15, 2022, issued in International Application No. PCT/KR2021/016467.
(Continued)

*Primary Examiner* — Brian S Roberts
(74) *Attorney, Agent, or Firm* — Jefferson IP Law, LLP

(57) ABSTRACT

A method, performed by a network entity, of executing a software package in a wireless communication system, is provided. The method includes identifying package information of each of a plurality of software packages and graphics processing unit (GPU) state information used by the plurality of software packages with respect to a plurality of user equipments (UEs) connected to the network entity, when a workload of at least one of the plurality of packages is changed, determining to change a GPU usage profile, based on the package information and the GPU state information, determining the number of packages to process the workload, identifications (IDs) of GPUs to be allocated to the packages, and usage locations of the GPUs, based on the package information and the GPU state information, updating the GPU usage profile, according to the determined IDs of the GPUs and the determined usage locations of the GPUs, and allocating the GPUs to the plurality of software packages, based on the updated GPU usage profile.

21 Claims, 12 Drawing Sheets

(51) Int. Cl.
*H04W 72/121* (2023.01)
*H04W 72/23* (2023.01)

(56) References Cited

U.S. PATENT DOCUMENTS

| | | | |
|---|---|---|---|
| 10,430,914 | B2 | 10/2019 | Westerhoff et al. |
| 10,871,998 | B2 * | 12/2020 | Parees ..................... G06F 9/505 |
| 2008/0263555 | A1 | 10/2008 | Ventroux et al. |
| 2019/0220319 | A1 | 7/2019 | Parees et al. |
| 2020/0242723 | A1 | 7/2020 | Colenbrander |
| 2023/0403242 | A1 * | 12/2023 | Phillips ............... H04L 41/0896 |

FOREIGN PATENT DOCUMENTS

| | | |
|---|---|---|
| EP | 3129870 A1 | 2/2017 |
| EP | 363 395 6 A1 | 4/2020 |
| JP | 2008-508584 A | 3/2008 |
| KR | 10-1953906 B1 | 6/2019 |
| KR | 10-2163402 B1 | 10/2020 |
| WO | 2014-047073 A1 | 3/2014 |

OTHER PUBLICATIONS

Heuser, "The Data Says: Mobile Traffic by Day and Time", Apr. 16, 2015.
European Search Report dated Mar. 14, 2024, issued in European Application No. 21892348.0.

* cited by examiner

FIG. 5
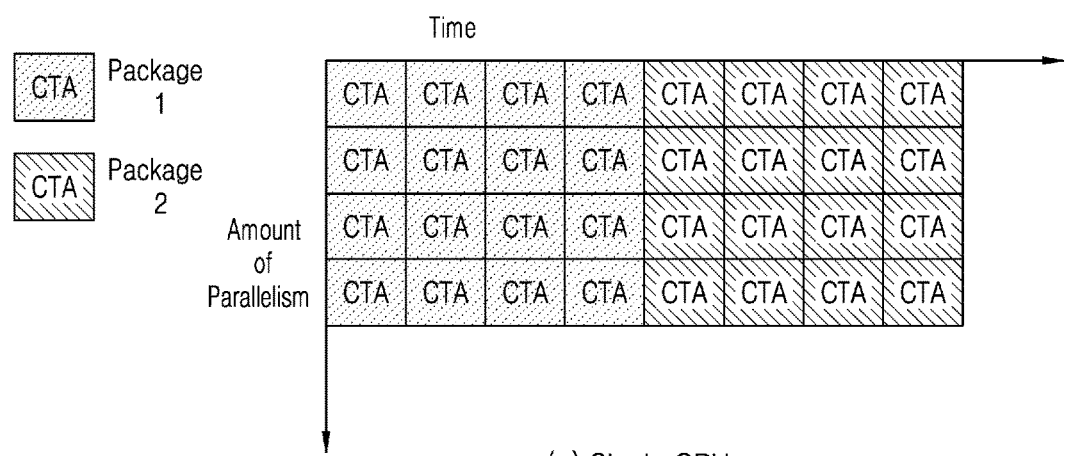
(a) Single GPU
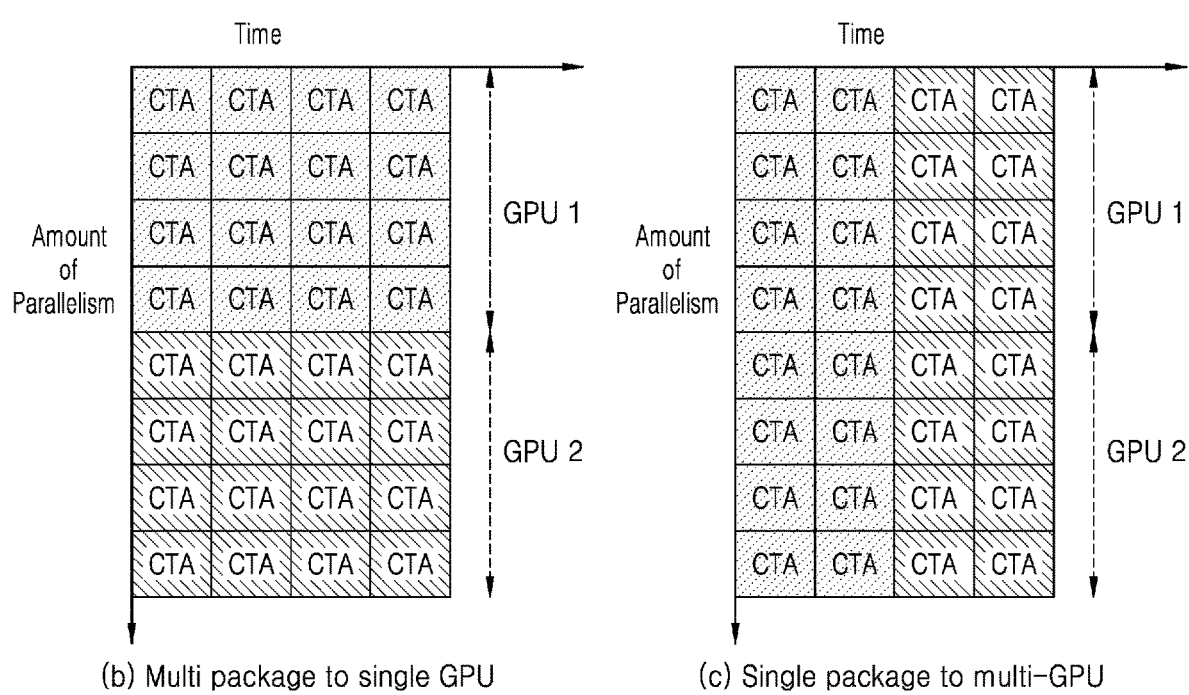
(b) Multi package to single GPU
(c) Single package to multi-GPU Multi Cell to Single GPU Single Cell to Multi GPU FIG. 8
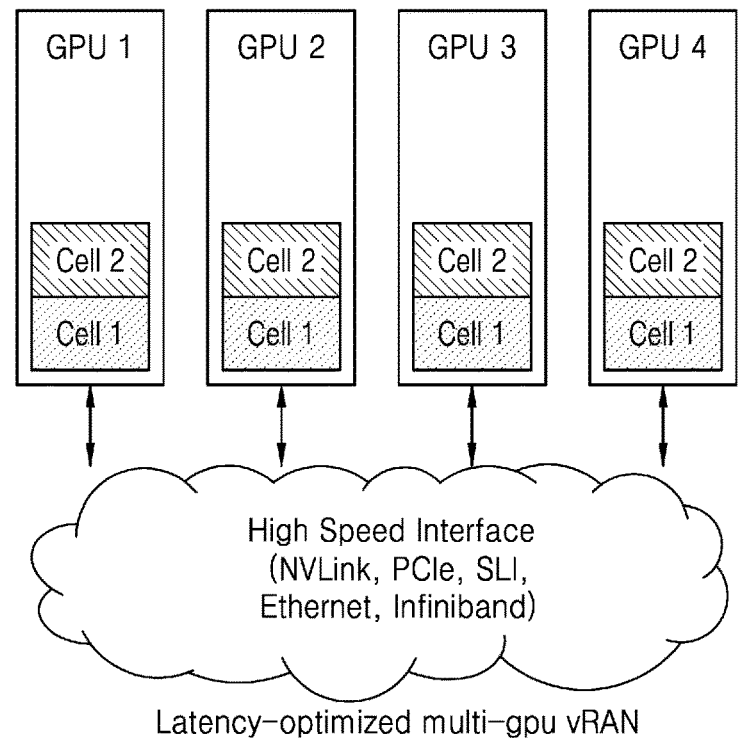
Latency-optimized multi-gpu vRAN
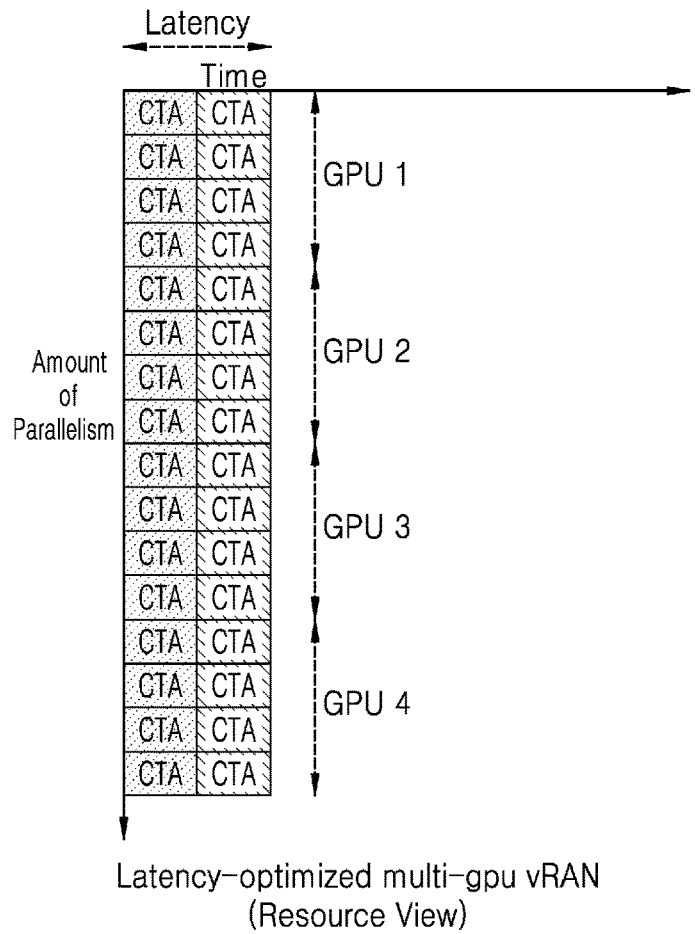
Latency-optimized multi-gpu vRAN
(Resource View)

FIG. 10
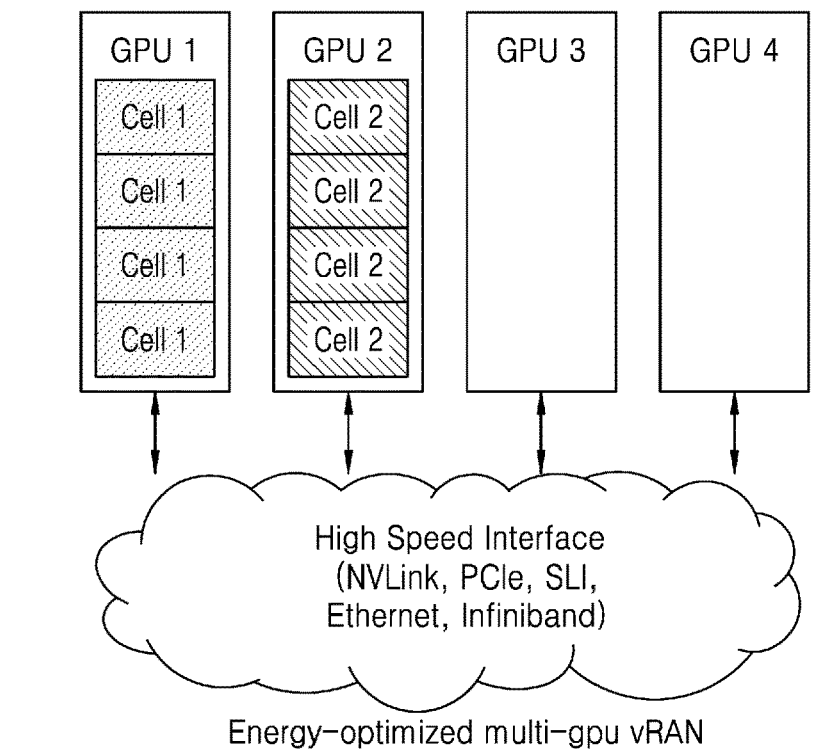
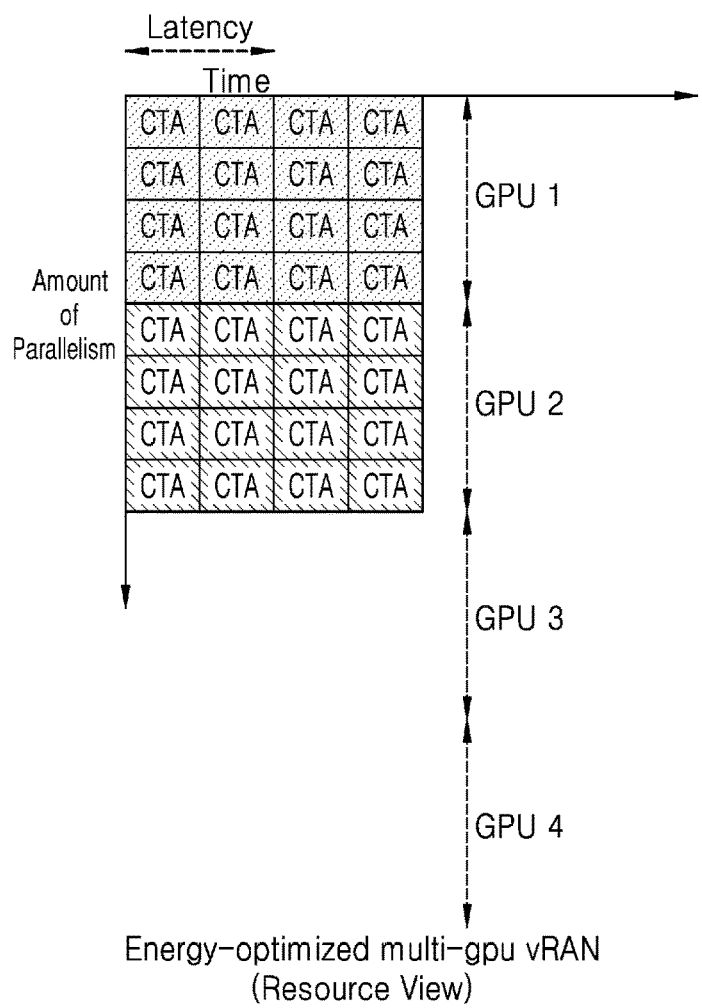

METHOD AND APPARATUS FOR ALLOCATING GPU TO SOFTWARE PACKAGE

CROSS-REFERENCE TO RELATED APPLICATION(S)

This application is a continuation application, claiming priority under § 365(c), of an International application No. PCT/KR2021/016467, filed on Nov. 11, 2021, which is based on and claims the benefit of a Korean patent application number 10-2020-0151325, filed on Nov. 12, 2020, in the Korean Intellectual Property Office, the disclosure of which is incorporated by reference herein in its entirety.

TECHNICAL FIELD

The disclosure relates to a method and apparatus for offloading hardware to a software package. More particularly, the disclosure relates to a method and apparatus for determining a graphics processing unit (GPU) set optimized for a plurality of software packages and applying the GPU set.

BACKGROUND ART

Virtualization refers to a technology aiming to efficiently use and manage a server resource, and is broadly developed to a hardware-based virtualization technology and a software-based virtualization technology. The virtualization technology is used not only in a mobile edge computing (MEC) service but also used in a virtualized radio access network (vRAN).

The virtualization technology may group multiple devices as one set, or may allow one device to operate as a plurality devices.

By virtualizing a hardware device, usability of a computing resource provided by the hardware device may be increased. By doing so, an operator may reduce costs of purchasing and maintaining a computing resource, and may save fixed costs for securing a space for pre-building an environment and hiring staff. Also, it is possible to sharply reducing a time taken to supply a computing resource and then start a business, and when a capacity increase is required, it is possible to request and immediately extend a resource.

A representative hardware-based virtualization technology may include a graphics processing unit (GPU). When the GPU is virtualized, it is possible to divide the GPU and allocate it to multiple software packages.

The GPU is a general-purpose processor and may be used not only to process graphics but also to process vRAN, MEC, simulation, real-time image processing, and deep learning.

The above information is presented as background information only to assist with an understanding of the disclosure. No determination has been made, and no assertion is made, as to whether any of the above might be applicable as prior art with regard to the disclosure.

DESCRIPTION OF EMBODIMENTS

Technical Problem

In a multi-graphics processing unit (GPU) system, each of software packages is allocated, through a GPU scheduler, a GPU to be used in executing a package. In this regard, system performance may vary depending on how GPUs are allocated to the software packages.

Aspects of the disclosure are to address at least the above-mentioned problems and/or disadvantages and to provide at least the advantages described below. Accordingly, an aspect of the disclosure is to provide a method of allocating a multi-GPU in the multi-GPU system by using a most efficient scheme to support higher performance in a virtualized radio access network (vRAN).

Technical Solution to Problem

A representative configuration of the disclosure which is provided to accomplish the technical solution is as below.

Additional aspects will be set forth in part in the description which follows and, in part, will be apparent from the description, or may be learned by practice of the presented embodiments.

In accordance with an aspect of the disclosure, a method, performed by a network entity, of executing a software package in a wireless communication system is provided. The method includes identifying package information of each of a plurality of software packages and graphics processing unit (GPU) state information used by the plurality of software packages with respect to a plurality of user equipments (UEs) connected to the network entity, when a workload of at least one of the plurality of packages is changed, determining to change a GPU usage profile, based on the package information and the GPU state information, determining the number of packages to process the workload, identifications (IDs) of GPUs to be allocated to the packages, and usage locations of the GPUs, based on the package information and the GPU state information, updating the GPU usage profile, according to the determined IDs of the GPUs and the determined usage locations of the GPUs, and allocating the GPUs to the plurality of software packages, based on the updated GPU usage profile.

In accordance with another aspect of the disclosure, a package information is provided. The package information includes information about a computation amount and a GPU usage amount and information about a package latency requirement of each of the plurality of software packages, the GPU state information includes information about use or non-use, a usage amount, a usage location, and power consumption of a GPU, and the GPU usage profile includes information about the number of GPUs used by a software package, IDs of the GPUs, a usage ratio of each of the GPUs, and a usage location of each of the GPUs.

According to another embodiment of the disclosure, the determining to change the GPU usage profile includes determining a GPU allocation mode, and the GPU allocation mode includes a latency priority mode or a power priority mode.

According to another embodiment of the disclosure, the determining to change the GPU usage profile includes comparing the package latency requirement with a processing time of the software package.

According to another embodiment of the disclosure, the determining to change the GPU usage profile includes comparing the power consumption of the GPU with a power consumption requirement of a system.

According to another embodiment of the disclosure, the determining of the IDs of the GPUs and the usage locations of the GPUs includes determining the number of GPUs to be allocated to each of the plurality of software packages, and according to the determined number of GPUs, determining IDs and usage ratios of the GPUs to be respectively allocated to the plurality of software packages.

According to another embodiment of the disclosure, the determining of the IDs of the GPUs and the usage locations of the GPUs includes based on the package information, determining GPU allocation priorities among the plurality of software packages.

According to another embodiment of the disclosure, the determining of the IDs of the GPUs and the usage locations of the GPUs includes based on the GPU state information, determining allocation priorities among the GPUs.

In accordance with another aspect of the disclosure, a network entity for executing a software package in a wireless communication system is provided. The network entity includes a communicator, a memory storing a plurality of instructions, and at least one processor configured to execute the plurality of instructions to identify package information of each of a plurality of software packages and graphics processing unit (GPU) state information used by the plurality of software packages with respect to a plurality of user equipments (UEs) connected to the network entity, when a workload of at least one of the plurality of packages is changed, determine to change a GPU usage profile, based on the package information and the GPU state information, determine the number of packages to process the workload, identifications (IDs) of GPUs to be allocated to the packages, and usage locations of the GPUs, based on the package information and the GPU state information, update the GPU usage profile, according to the determined IDs of the GPUs and the determined usage locations of the GPUs, and allocate the GPUs to the plurality of software packages, based on the updated GPU usage profile.

According to an embodiment of the disclosure, a computer-readable recording medium having recorded thereon a program for performing the method is provided.

In addition, provided is a computer-readable recording medium having recorded thereon a computer program for executing other methods, systems, and the method which are for implementing the disclosure is provided.

Advantageous Effects of Disclosure

In a multi-graphics processing unit (GPU) system, each of software packages is allocated, through a GPU scheduler, a GPU to be used in executing a package. In this regard, system performance may vary depending on how GPUs are allocated to the software packages.

According to an embodiment of the disclosure, GPUs may be allocated to software packages so as to optimize performance of a multi-GPU system.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which:

FIG. 5 is a diagram for describing a method by which a network entity decreases latency when the network entity schedules a plurality of GPUs so as to process a plurality of software packages in a wireless communication system according to an embodiment of the disclosure;

FIG. 8 is a diagram illustrating resource distribution and latency when a network entity allocates a plurality of packages to a plurality of GPUs in a latency priority mode in a wireless communication system according to an embodiment of the disclosure;

FIG. 10 is a diagram illustrating resource distribution and latency when a network entity allocates a plurality of packages to a plurality of GPUs in a power priority mode in a wireless communication system according to an embodiment of the disclosure;

Throughout the drawings, it should be noted that like reference numbers are used to depict the same or similar elements, features, and structures.

MODE OF DISCLOSURE

Figure 1:
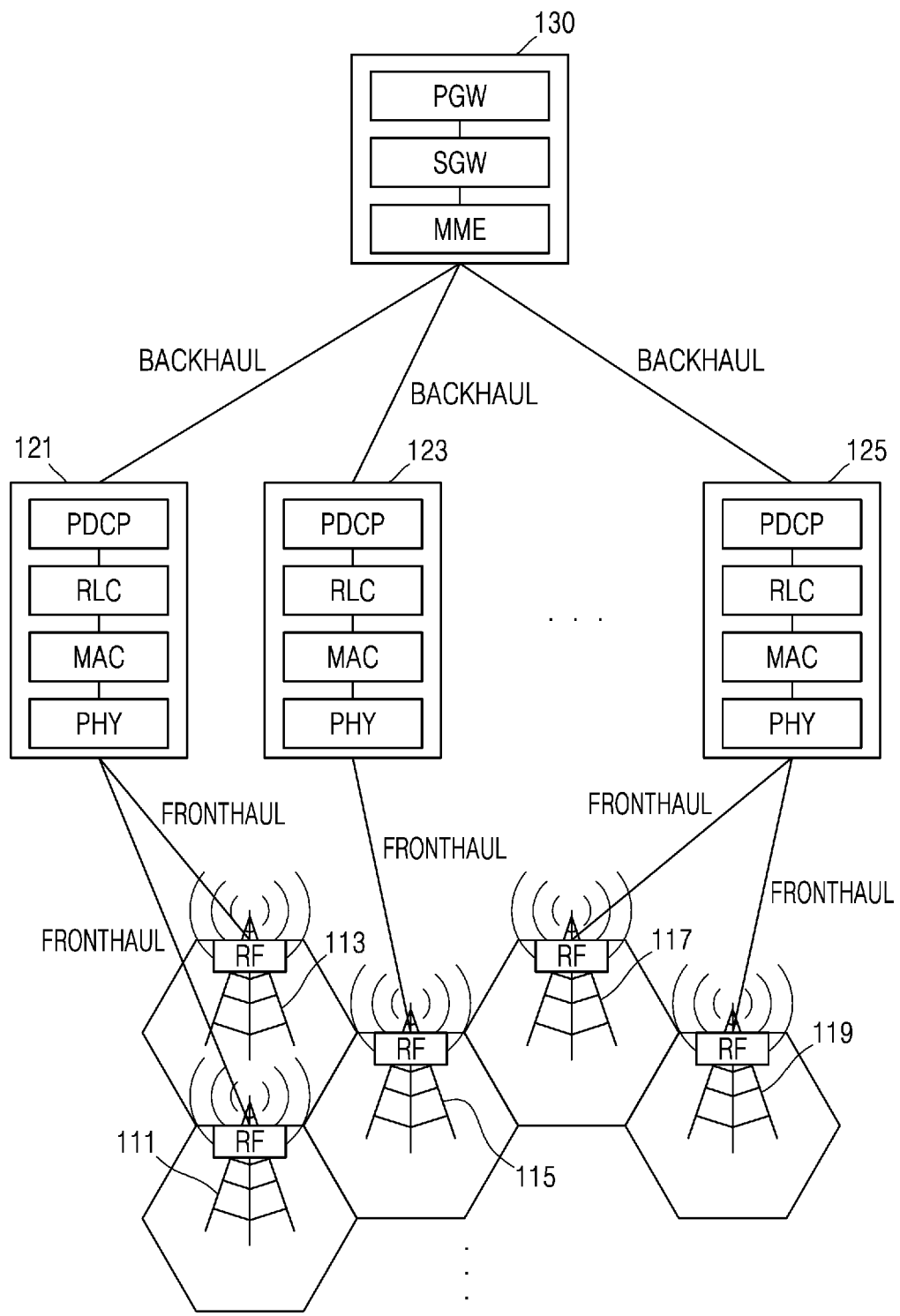
FIG. 1 is a diagram for describing a structure of a centralized/cloud radio access network (cRAN) according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates only a, only b, only c, both a and b, both a and c, both b and c, all of a, b, and c, or variations thereof.

Embodiments of the disclosure will now be described more fully with reference to the accompanying drawings. In the following description of embodiments of the disclosure, descriptions of techniques that are well known in the art and not directly related to the disclosure are omitted. This is to clearly convey the gist of the disclosure by omitting an unnecessary explanation.

For the same reason, some components in the drawings are exaggerated, omitted, or schematically illustrated. Also, the size of each component does not entirely reflect the actual size. In the drawings, the same or corresponding components are denoted by the same reference numerals.

The advantages and features of the disclosure and methods of achieving them will become apparent with reference to embodiments of the disclosure described in detail below with reference to the accompanying drawings. The disclosure may, however, be embodied in many different forms and should not be construed as limited to embodiments set forth herein; rather these embodiments are provided so that this disclosure will be thorough and complete, and will fully convey the scope of the disclosure only defined by the claims to one of ordinary skill in the art. In the specification, the same components are denoted by the same reference numerals.

It will be understood that each block of flowchart illustrations, and combinations of blocks in the flowchart illustrations, may be implemented by computer program instructions. The computer program instructions may be provided to a processor of a general-purpose computer, special purpose computer, or other programmable data processing apparatus, such that the instructions, which are executed via the processor of the computer or other programmable data processing apparatus, generate means for performing functions specified in the flowchart block(s). The computer program instructions may also be stored in a computer-executable or computer-readable memory that may direct the computer or other programmable data processing apparatus to function in a particular manner, such that the instructions stored in the computer-executable or computer-readable memory produce an article of manufacture including instruction means that perform the functions specified in the flowchart block(s). The computer program instructions may also be loaded onto the computer or other programmable data processing apparatus to cause a series of operations to be performed on the computer or other programmable apparatus to produce a computer-implementable process such that the instructions that are executed on the computer or other programmable apparatus provide operations for implementing the functions specified in the flowchart block(s).

In addition, each block of the flowchart illustrations may represent a module, a segment, or part of code, which includes one or more executable instructions for performing specified logical function(s). Also, it should be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Here, the term "~unit," as used in the embodiment of the disclosure refers to a software or hardware component, such as field-programmable gate array (FPGA) or application-specific integrated circuit (ASIC), which performs certain tasks. However, the term "unit" does not mean to be limited to software or hardware. A "unit" may be configured to be in an addressable storage medium or configured to operate one or more processors. Thus, a "unit" may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in the components and "units" may be combined into fewer components and "units" or may be further separated into additional components and "units." Further, the components and "units" may be implemented to operate one or more central processing units (CPUs) in a device or a secure multimedia card. Also, a "unit" may include one or more processors in an embodiment of the disclosure.

A wireless communication system has been developed from a wireless communication system providing voice centered services in the early stage toward a broadband wireless communication system providing high-speed, high-quality packet data services, like communication standards of high speed packet access (HSPA), long term evolution (LTE or evolved universal terrestrial radio access (E-UTRA)), LTE-advanced (LTE-A), and LTE-Pro of the 3rd Generation Partnership Project (3GPP), high rate packet data (HRPD) and ultra mobile broadband (UMB) of 3GPP2, 802.16e of the Institute of Electrical and Electronic Engineers (IEEE), or the like. Also, as a next generation wireless communication system, a 5th generation (5G) or new radio (NR) wireless communication system is being established.

In the next generation wireless communication system, at least one of services including enhanced Mobile BroadBand (eMBB), massive Machine Type Communications (mMTC), and Ultra-Reliable and Low-Latency Communications (URLLC) may be provided to a user equipment (UE). The services may be provided to a same UE or different UEs during a same time period. The eMBB service may be for high-speed transmission of high-volume data, the mMTC service may be for minimization of power consumption by the terminal and accesses by multiple terminals, and the URLLC service may be for high reliability and low latency, but the disclosure is not limited thereto. The services may be primary services in a wireless communication system such as an LTE system or a 5G or new radio/next radio (NR) system after the LTE system.

For convenience of descriptions, in the disclosure, terms and names or modifications of the terms and names defined in the $3^{rd}$ Generation Partnership Project Long Term Evolution (3GPP LTE) standard are used therein. However, the disclosure is not limited to these terms and names, and may be equally applied to wireless communication systems conforming to other standards. For example, although 5G (or NR) systems are mentioned as examples in the following description, embodiments of the disclosure may also be applied to other wireless communication systems having similar technical backgrounds or channel types. As another example, embodiments of the disclosure may be applied to an LTE or LTE-A system which is a wireless communication system before the NR system, and furthermore, embodiments of the disclosure may be applied to a wireless communication system to be developed after the NR system. Furthermore, embodiments of the disclosure may be applied to other wireless communication systems through partial modifications at the discretion of one of ordinary skill in the art without greatly departing from the scope of the disclosure.

Hereinafter, terms identifying an access node, terms indicating network entities, terms indicating messages, terms indicating an interface between network entities, and terms indicating various pieces of identification information, as used in the following description, are exemplified for convenience of explanation. Accordingly, the disclosure is not limited to terms to be described below, and other terms indicating objects having equal technical meanings may be used.

In the disclosure, a base station is an entity that allocates resources to a terminal, and may be at least one of a next generation Node B (gNode B, gNB), an evolved Node B (eNode B, eNB), a Node B, a base station (BS), a radio access unit, a BS controller, or a node on a network.

In the disclosure, a terminal may include a UE, a mobile station (MS), a cellular phone, a smartphone, a computer, or a multimedia system capable of performing a communication function.

In the disclosure, a cell may indicate an area covered by one BS in wireless communication. The cell may be classified into a mega cell, a macro cell, a micro cell, or a pico cell, based on a size of the cell, but these are merely an example and types of the cell are not limited thereto.

In the disclosure, a downward link or a downlink (DL) is a wireless transmission path of a signal transmitted from a BS to a UE, and an upward link or an uplink (UL) is a wireless transmission path of a signal transmitted from a UE to a BS. More particularly, as a representative example of the broadband wireless communication system, the LTE system has adopted an orthogonal frequency division multiplexing (OFDM) scheme in a DL and has adopted a single carrier frequency division multiple access (SC-FDMA) scheme in an UL. The UL refers to a radio link via which a UE (also referred to as a terminal) or an MS transmits data or a control signal to a BS (e.g., an eNB), and the DL refers to a radio link via which a BS transmits data or a control signal to a UE.

In the disclosure, a controller may also be referred to as a processor.

In the disclosure, a layer (or a layer apparatus) may also be referred to as an entity.

FIG. 1 is a diagram for describing a structure of a centralized/cloud radio access network (cRAN) according to an embodiment of the disclosure.

Referring to FIG. 1, in the cRAN, a radio transceiver (also referred to as a radio unit (RU)) and a data processor (also referred to as a data unit (DU)) included in a legacy BS are now separate, and thus, a RU may be positioned in a BS 111 of a cell site and a DU 121 may be positioned in a central server. A cell corresponds to an area covered by a BS in a wireless communication system, and at least one cell may exist for each BS. Unlike an integrated BS where both an RU and a DU exist in a cell site, in the cRAN, RUs may be positioned in BSs 111, 113, 115, 117, and 119 of the cell site, and DUs 121, 123, and 125 may be gathered to perform at least some functions among RAN functions. Descriptions of the RAN functions will be provided at a later time. The cRAN may collect and manage the DUs 121, 123, and 125, thereby easily adjusting interference between cells and providing a service including coordinated multi-point transmission and reception (CoMP) or the like.

The BSs 111, 113, 115, 117, and 119 of the cell site may include a radio frequency (RF) device or the like, and may transmit a signal to a data processor (e.g., the DU 121) via a fronthaul. The fronthaul indicates a network part that connects the BSs 111 and 113 of the cell site to a data processor (e.g., the DU 121), and may perform digital signal processing (DSP), power amplification, a filtering function, or the like.

A data processor (e.g., the DU 121) may process a signal received from a BS (e.g., the BS 111) of the cell site, and may transmit the processed signal to a core network device 130 via a backhaul. The core network device 130 may include devices that connect an end-to-end system consisting of a BS and a UE. For example, the core network device 130 may include a packet data network gateway (P-GW), a serving gateway (S-GW), a mobile management entity (MME), or the like. The P-GW may connect an internal node of a core network with external internet, may configure an Internet Protocol (IP) address to a UE, and may perform IP packet filtering. The S-GW may buffer a DL packet received from external internet, when radio resource control (RRC) connection is not configured with respect to the UE. The MME may process a control signal related to location registration, authentication, and calls of the UE. However, this is a merely an example, and a configuration of the core network device 130 is not limited to the aforementioned example.

A backhaul indicates a network part that connects a data processor (e.g., the DU 121) to the core network device 130 and may be implemented as a wired interface such as an optical fiber, but this is merely an example, and the backhaul may be implemented as a wireless network.

A data processor (e.g., the DU 121) may perform various RAN functions for processing signals. The RAN functions may include a packet data convergence protocol (PDCP) layer function, a radio link control (RLC) layer function, a medium access control (MAC) layer function, and a physical (PHY) layer function, but these are merely an example and thus, the RAN functions are not limited thereto. Hereinafter, functions of a PDCP layer, an RLC layer, a MAC layer, and a PHY layer will now be described.

The functions of the PDCP layer may include at least some functions among functions below.
  Header compression and decompression: robust header
    compression (ROHC) only
  Transfer of user data
  In-sequence delivery of upper layer protocol data units
    (PDUs)
  PDCP PDU reordering
  Duplicate detection of lower layer service data units
    (SDUs))
  Retransmission of PDCP SDUs
  Ciphering and deciphering
  Timer-based SDU discard in UL The reordering function of the PDCP layer may include at least one of a function of reordering PDCP PDUs received from a lower layer, on a PDCP sequence number (SN) basis, a function of delivering the reordered data to an upper layer in order, a function of recording missing PDCP PDUs by reordering the received PDCP PDUs, a function of reporting status information about the missing PDCP PDUs to a transmitter, or a function of requesting to retransmit the missing PDCP PDUs.

The functions of the RLC layer may include at least some functions among functions below.
  Transfer of upper layer PDUs
  In-sequence delivery of upper layer PDUs
  Out-of-sequence delivery of upper layer PDUs
  Error Correction through automatic repeat request (ARQ)
  Concatenation, segmentation and reassembly of RLC SDUs
  Re-segmentation of RLC data
  Reordering of RLC data
  Duplicate detection
  Protocol error detection
  RLC SDU discard
  RLC re-establishment The in-sequence delivery function of the RLC layer may include a function of delivering RLC SDUs received from a lower layer, to an upper layer in order, and a function of reassembling the RLC SDUs and delivering the reassembled RLC SDU when a plurality of RLC SDUs segmented from one RLC SDU are received. Also, the in-sequence delivery function may include a function of reordering received RLC PDUs on a RLC SN or PDCP SN basis, a function of recording missing RLC PDUs by reordering the received RLC PDUs, and a function of reporting status information about the missing RLC PDUs to a transmitter. Also, the in-sequence delivery function may include a function of requesting to retransmit the missing RLC PDUs, and a function of delivering only RLC SDUs prior to a missing RLC SDU, to an upper layer in order when the missing RLC SDU exists. Also, the in-sequence delivery function may include a function of delivering all RLC SDUs received before a timer starts, to an upper layer in order although a missing RLC SDU exists when a preset timer expires, or a function of delivering all RLC SDUs received so far, to an upper layer in order although a missing RLC SDU exists when a preset timer expires.

The RLC layer may process RLC PDUs in order of reception, regardless of SNs, and may deliver the RLC PDUs to the PDCP layer. When a segment is received, the RLC layer may assemble the segment with other segments stored in a buffer or to be subsequently received, into a whole RLC PDU and may deliver the RLC PDU to the PDCP layer. In a NR system, the RLC layer may not have a concatenation function, and the concatenation function may be performed by the MAC layer or may be replaced with a multiplexing function of the MAC layer.

The functions of the MAC layer may include at least some functions among functions below.
  Mapping between logical channels and transport channels
  Multiplexing/demultiplexing of MAC SDUs
  Scheduling information reporting
  Error correction through HARQ
  Priority handling between logical channels of one UE
  Priority handling between UEs by means of dynamic scheduling
  MBMS service identification
  Transport format selection
  Padding The PHY layer may perform at least some functions among functions below.
  Transmission and reception of data by using an electrical signal
  Channel coding/decoding function
  Modulation/demodulation function
  Power control
  Cell search The PHY layer may perform channel coding and modulation on data of an upper layer, may generate an OFDM symbol thereof, and may transmit the OFDM symbol via a wireless channel. Also, the PHY layer may perform demodulation and channel decoding on an OFDM symbol received via a wireless channel, and may deliver data obtained therefrom to an upper layer.

However, the aforementioned example is merely an example of the RAN functions, and the RAN functions may also include a function of an RRC layer. Examples of the function of the RRC layer are as below.
  Broadcasting of cell system information necessary for all terminals within a cell
  Management of delivery of a paging message
  Management (set/maintain/release) of RRC connection between a wireless terminal and E-UTRAN
  Transmission of UE context between eNBs in handover
  Setting, resetting, release of radio bearer
  UE measurement reporting and control thereof
  UE capability management: Temporarily apply cell ID to UE
  Security management including key management: RRC message ciphering, and the like A BS (e.g., the BS 111) of the cell site may be described by using terms such as a RU, a remote radio head (RRH), or the like, and a data processor (e.g., the DU 121) may be described by using terms such as a DU, a base band unit (BBU), or the like.

To collect and manage the DUs 121, 123, and 125 that perform the aforementioned RAN functions, it is necessary to provide a method of efficiently using physical resources necessary for data processing. To this end, the disclosure provides a method of performing, through virtualization, one or more RAN functions performed by the DUs 121, 123, and 125. The virtualization refers to a technology of extending a resource, which was usable by one device, by integrating and managing a plurality of physical resources.

Figure 2:
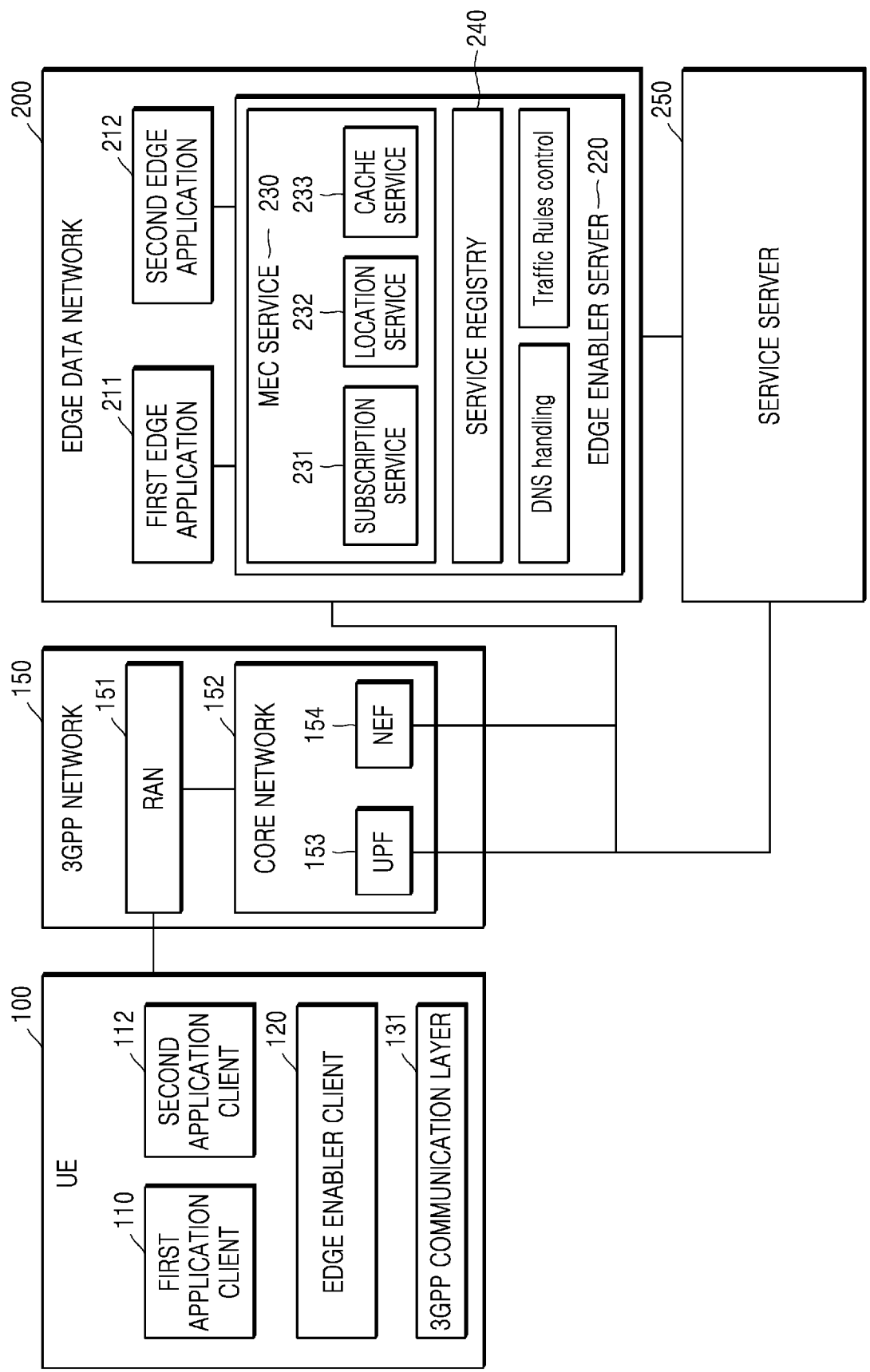
FIG. 2 is a diagram illustrating a network environment for supporting a mobile edge computing (MEC)-based service according to an embodiment of the disclosure.

FIG. 2 is a diagram illustrating a network environment for supporting a mobile edge computing (MEC)-based service according to an embodiment of the disclosure.

Referring to FIG. 2, the network environment may include a UE 100, a 3$^{rd}$ Generation Partnership Project (3GPP) network 150, an edge data network 200, and a service server 250. However, a configuration included in the network environment is not limited thereto.

According to an embodiment of the disclosure, each of components included in the network environment may indicate a physical entity unit or may indicate software or a module unit capable of performing an individual function. Therefore, each component included in the network environment may be referred to as an entity or a function.

According to an embodiment of the disclosure, the UE 100 may indicate a device used by a user. For example, the UE 100 may indicate a user terminal, a remote terminal, a wireless terminal, or a user device. Also, the UE 100 may include all types of a device.

According to an embodiment of the disclosure, the UE 100 may drive (or, execute) a plurality of application clients. For example, the UE 100 may include a first application client 110 and a second application client 112. The plurality of application clients may require different network services, based on at least one of a data rate of the UE 100, latency (or speed), reliability, the number of the UEs 100 accessing a network, a network access period of the UE 100, or an average data usage amount. The different network services may include, for example, an eMBB service, an URLLC service, or an mMTC service.

An application client of the UE 100 may indicate a default application previously installed in UE 100 or an application provided by a third party. That is, the application client of the UE 100 may indicate a client application program driven in the UE 100 for a particular application service. A plurality of application clients may be driven in the UE 100. At least one of the application clients may be used to provide an edge computing service from the edge data network 200 to the UE 100. For example, an application client may be an application installed and executed in the UE 100 and may provide a function of transmitting and receiving data via the edge data network 200. The application client in the UE 100 may refer to application software (or, a module) executed in the UE 100 to use a function provided by one or more particular edge applications.

According to an embodiment of the disclosure, a plurality of application clients 110 and 112 in the UE 100 may perform data transmission and reception with the service server 250 based on a required network service type, or may perform data transmission and reception with the edge data network 200 based on edge computing. For example, when the first application client 110 does not require low latency, the first application client 110 may perform data transmission and reception with the service server 250. As another example, when the second application client 112 requires low latency, the second application client 112 may perform MEC-based data transmission and reception with the edge data network 200. However, the disclosure is not limited to the example, and the UE 100 may determine whether to transmit or receive data with the service server 250 or the edge data network 200, based on various conditions as well as latency.

According to an embodiment of the disclosure, an application client of the UE 100 may be referred to as a UE application (UE App), an application client, a client application (client App), or a UE application. Hereinafter, in the disclosure, for convenience of descriptions, an application client of the UE 100 will now be referred to as an application client.

According to an embodiment of the disclosure, the UE 100 may include an edge enabler client 120 and a 3GPP communication layer 131. According to an embodiment of the disclosure, the edge enabler client 120 may indicate a layer configured to perform an operation in the UE 100 so as to enable the UE 100 to use an edge computing service. According to an embodiment of the disclosure, the edge enabler client 120 may be referred to as an MEC enabling layer. The edge enabler client 120 may perform an operation of determining which UE App can use an edge computing service, and connecting the UE 100 with a network interface so as to enable data of the application client of the UE 100 to be transmitted to the edge data network 200 providing the edge computing service.

Also, the edge enabler client 120 and the 3GPP communication layer 131 may perform an operation of establishing data connection for enabling the UE 100 to use the edge computing service. The 3GPP communication layer 131 may indicate a layer performing a modem operation for using a mobile communication system, and may be configured to establish wireless connection for data communication, register the UE 100 to the mobile communication system, establish connection for data transmission in the mobile communication system, and transmit or receive data.

The UE 100 may be connected to the 3GPP network 150 and thus, may transmit or receive data related to the first application client 110 and the second application client 112.

According to an embodiment of the disclosure, the 3GPP network 150 refers to a wireless communication system complying with the standard rules of the 3GPP, and may be connected to the UE 100 and then may provide a wireless communication service to the UE 100. The 3GPP network 150 may include a third generation (3G) network, an LTE network, an LTE-A network, and a next-generation network (5G or NR). However, the disclosure is not limited to the example, and the 3GPP network 150 of the disclosure may include a network configured with a different communication technology.

According to an embodiment of the disclosure, the 3GPP network 150 may include a RAN 151 and a core network 152, and the core network 152 may include a user plane function (UPF) 153 and a network exposure function (NEF) 154. However, this is merely an example of a network function (NF) configuring the core network 152, and a configuration of the core network 152 is not limited to the aforementioned example.

According to an embodiment of the disclosure, the RAN 151 of the 3GPP network 150 refers to a network that is directly connected to the UE 100, and is an infrastructure providing a wireless access to the UE 100. The RAN 151 may include a plurality of BSs, and the plurality of BSs may perform communication through interfaces between the plurality of BSs. At least some interfaces between the plurality of BSs may be wired or wireless interfaces. A BS may be referred to as a gNB, an eNB, a Node B, a radio access unit, a BS controller, a node on a network, or other terms having equal technical meanings.

According to an embodiment of the disclosure, the core network 152 of the 3GPP network 150 may process data and control signals with respect to the UE 100 which are transmitted or received via the RAN 151. The core network 152 may perform various functions including control of a user plane and a control plane, processing of mobility, management of subscriber information, billing, interoperation with a different type of a system (e.g., the LTE system), and the like. In order to perform the various functions, the core network 152 may include a plurality of entities that have different NFs and are functionally separate.

For example, the core network 152 may include the UPF 153, an access and mobility management function (AMF) (not shown), a session management function (SMF) (not shown), a policy control function (PCF) (not shown), the NEF 154, a user data management (UDM) (not shown), a network data analysis function (NWDAF) (not shown), and a gateway mobile location center (GMLC) (not shown).

The 3GPP network 150 may be connected to the edge data network 200 and thus, may transmit or receive data related to an MEC service. Also, the UPF 153 may provide a data path (or, a data plane) between the UE 100 and the edge data network 200 or between the UE 100 and the service server 250. That is, the UPF 153 may serve as a gateway for delivering data (or, a data packet) transmitted or received to or from the UE 100.

The UE 100 and the edge data network 200 may transmit or receive data (or, a data packet) there between via the UPF 153. A data network (DN) may exist between the edge data network 200 and the UPF 153. The UPF 153 may be located close to the edge data network 200 so as to support the UE 100 with the edge computing service, and may deliver a data packet of the UE 100 to the edge data network 200 with low latency or deliver a data packet of the edge data network 200 to the UE 100 with low latency.

The UPF 153 may provide a data path between the UE 100 and the edge data network 200 by using a data network connected to the Internet. The UPF 153 may route a data packet to a DN between the service server 250 and the UE 100, the data packet being supposed to be delivered to the Internet from among data packets transmitted from the UE 100.

A UPF in the 3GPP 5G network is a base configuration component of core infrastructure system architecture, and 5G network can easily support an MEC service by dispersedly arranging UPFs to provide applications at various positions.

The UPF defined in the 3GPP provides functions below.

Interconnect point between a mobile infrastructure and a DN, i.e., encapsulation and decapsulation of a general packet radio service (GPRS) tunneling protocol for a user plane (GTP-U)

Protocol data unit (PDU) session anchor point for providing mobility within or between radio access technologies (RATs), including transmission of one or more end marker packets to a next generation node B (gNB)

Packet routing and forwarding, including performing the role of UL classifier/UL-CL (directing flows to specific DNs based on traffic matching filters) and a branching point, when acting as an immediate UPF (I-UPF) multi-homed to more than two PDU session anchors (PSAs)

Application detection using Service data flow (SDF) traffic filter templates or 3-tuple (protocol, server-side IP address and port number) packet flow description (PFD) received from SMF Per-flow QoS handling, including transport level packet marking for UL/DL, rate limiting and reflective QoS (DSCP) marking on DL.

Traffic usage reporting for billing and a lawful intercept (LI) collector interface The NEF 154 is an NF configured to expose, to the outside, capabilities and services of NFs of the 3GPP network 150. The NEF 154 may be connected to an external server (e.g., the edge data network 200), and thus may transmit information about an event occurring in an internal NF of the 3GPP network 150 or may transmit information about an event requested by the external server. The capabilities and services the NEF 154 exposes to the outside may include, for example, event reporting on a position of the UE 100, event reporting on a session of the UE 100, event reporting on mobility management of the UE 100, and the like. The external server may subscribe the capabilities and services exposed by the NEF 154 and thus may access the capabilities and services.

The edge data network 200 may provide an MEC service to the UE 100. To this end, the edge data network 200 may be placed in a BS of the 3GPP network 150 to which the UE 100 is connected or at a location geographically close to the BS, and may provide content whose part is equal to content provided by the service server 250. The edge data network 200 may be referred to as an MEC server, an MEC host, an edge computing server, a mobile edge host, an edge computing platform, and the like.

According to an embodiment of the disclosure, the edge data network 200 may include a plurality of edge applications and may execute (or, drive) the edge applications. For example, the edge data network 200 may include a plurality of edge applications (a first edge application 211 and a second edge application 212), and an edge enabler server 220. However, these are merely an example, and a configuration of the edge data network 200 is not limited thereto.

According to an embodiment of the disclosure, an edge application may indicate an application provided by a third party in the edge data network 200 which provides an edge computing service, and may establish a data session with an application client so as to transmit or receive data related to the application client. The data session may indicate a communication path established by the application client of the UE 100 and the edge application of the edge data network 200 so as to transmit or receive data.

According to an embodiment of the disclosure, the edge data network 200 may provide a virtual resource to the edge application. For example, the virtual resource may include at least one of a computing resource, a storage resource, or a network resource (e.g., a network bandwidth), which is usable by the edge application. The edge application of the edge data network 200 may be executed (or, driven) by using a virtual machine.

According to an embodiment of the disclosure, the application of the edge data network 200 may be referred to as an edge application, a MEC App, an edge application server, a ME(MEC) App, and the like. Hereinafter, in the disclosure, for convenience of descriptions, the application of the edge data network 200 will now be referred to as an edge application.

According to an embodiment of the disclosure, the edge data network 200 may include the edge enabler server 220. The edge enabler server 220 may be referred to as an MEC platform, a mobile edge (ME) platform (MEP), a platform, and the like.

According to an embodiment of the disclosure, the edge enabler server 220 may provide a function requested in executing the edge application. For example, the edge enabler server 220 may provide a function or an environment in which the edge application can provide an MEC service to the UE 100 or the like or the edge application can consume an MEC service. Also, the edge enabler server 220 may perform traffic control or may perform Domain Name System (DNS) handling.

Hereinafter, an MEC service may indicate a service the edge data network 200 or the edge application provides to the UE 100 or a service usable by the edge application.

According to an embodiment of the disclosure, an edge computing service may collectively refer to services related to procedures and information requested to use the edge application. The edge computing service may be provided or consumed by the edge enabler server 220 or the edge application. For example, the edge application may provide an edge computing service to the UE 100, or may use an edge computing service provided by the edge enabler server 220 so as to provide an edge computing service to the UE 100. Also, the edge enabler server 220 may provide the edge application with an edge computing service that is usable by the edge application to provide an edge computing service to the UE 100. Hereinafter, an edge computing service may indicate a service the edge data network 200 or the edge application provides to the UE 100 or may indicate a service that is provided by the edge enabler server 220 and is usable by the edge application.

According to an embodiment of the disclosure, the edge enabler server 220 may provide an edge computing service to the edge application. For example, the edge enabler server 220 may provide various information (data, contents or the like, for example, information about a location of a UE, caching data, information about a subscribed service or the like) to the edge application, according to a provided edge computing service. The edge application may provide an edge computing service to the UE 100 by using an edge computing service provided by the edge enabler server 220. For example, the edge application may provide an edge computing service to the UE 100, based on a plurality of pieces of information provided as an edge computing service by the edge enabler server 220. The edge computing service provided to the UE 100 may be a service requested for the UE 100 to drive an application client (e.g., provision of data requested to run the application client). Hereinafter, provision of an edge computing service from the edge data network 200 to the UE 100 may indicate that the edge application of the edge data network 200 provides an edge computing service requested for the UE 100 to drive the application client.

The edge enabler server 220 may include an MEC service 230 and a service registry 240. The MEC service 230 may provide an edge computing service to edge applications included in the edge data network 200. The MEC service 230 may be implemented as software or a module which can perform an individual function. The service registry 240 may provide information about a service available in the edge data network 200.

According to an embodiment of the disclosure, when an instance of an edge application is instantiated, the edge enabler server 220 may internally register the edge application. The edge enabler server 220 may register the edge application and may store information related to the edge application. The information related to the edge application which is stored in the edge enabler server 220 may include information about an edge computing service to be provided from the edge application to the UE 100 or the like, information indicating whether the edge computing service is a required service or an optional service for the edge application, and the like.

According to an embodiment of the disclosure, the edge application may register a new edge computing service in the edge enabler server 220, may update a pre-registered edge computing service, or may retrieve an edge computing service registered in the edge enabler server 220. When the edge application registers or updates an edge computing service to the edge enabler server 220, the edge application may provide the edge enabler server 220 with information about the edge computing service to be registered or updated. The edge enabler server 220 may register the edge computing service in the service registry 240.

According to an embodiment of the disclosure, the edge enabler server 220 may transmit information about edge computing services registered in the service registry 240 to an edge application in the edge data network 200. For example, the edge enabler server 220 may transmit, to the edge application, a list of the edge computing services registered in the service registry 240. Also, the edge enabler server 220 may transmit, to the edge application, information about availability of edge computing services registered or newly registered in the service registry 240.

According to an embodiment of the disclosure, the edge application may subscribe the MEC service 230 registered in the service registry 240. The edge application may transmit subscription request information about an edge computing service to the edge enabler server 220, and thus, may subscribe the edge computing service. The subscription of the MEC service 230 by the edge application may indicate that the edge application is continuously provided the MEC service 230 or information about the MEC service 230 from the edge enabler server 220. By subscribing the MEC service 230 registered in the service registry 240, the edge application may use the MEC service 230 by being provided the MEC service 230 from the edge enabler server 220, and may provide the MEC service 230 to the UE 100.

According to an embodiment of the disclosure, the MEC service 230 may provide various services to the edge application. For example, the MEC service 230 may provide, to the edge application, a subscription service 231, a location service 232, a cache service 233, and the like.

The subscription service 231 may provide information about an event to the 3GPP network 150 or may be provided information about the event from the 3GPP network 150. The event may include an event about a change in traffic or service usage by a UE, an event related to a location of the UE (e.g., a current location of the UE, a change in a location, a location of the UE in a particular situation, and the like), disconnection with respect to the UE, an access by the UE, a roaming state of the UE, a communication failure, or the like.

The location service 232 may provide information about a location of the UE 100, a service based on the information about the location of the UE 100, and the like. The location service 232 may obtain the information about the location of the UE 100 via the 3GPP network 150. The information about the location of the UE 100 may include Global Positioning System (GPS) information of the UE 100, information about an area where the UE 100 is located, information about a route on which the UE 100 moves, information about a cell to which the UE 100 is connected (or camped on), information about a cell to which the UE 100 is to be handed over, and the like. The information about the location of the UE 100 is not limited to the example and may include all information related to the location of the UE 100.

The cache service 233 may cache data from the service server 250 and may provide the data. Caching may indicate a technology of pre-obtaining data from a data provision server before occurrence of a data request and storing the data, thereby providing the data with low latency, in response to the data request. In the disclosure, caching may refer to a series of processes in which, before a request by the UE 100 or the application client occurs, data to be provided by the service server 250 is requested to the service server 250 and is pre-stored. The edge data network 200 may pre-store, through caching, data to be provided to the UE 100 in the edge data network 200 located closer than the service server 250, and thus, may decrease a network transmission delay.

The service server 250 may provide content related to an application (e.g., an application client, an edge application, etc.) of the UE 100. The edge data network 200 may transmit or receive data to or from the service server 250 so as to provide an MEC service, and may previously cache data from the service server 250.

According to an embodiment of the disclosure, the UE 100 may transmit or receive data to or from the service server 250, based on a network service type requested by the plurality of application clients (e.g., the first application client 110 and the second application client 112). The service server 250 may provide a service or data required for the UE 100 to drive (or, execute) an application client, and may provide the edge data network 200 with an edge application capable of providing an edge computing service to the application client of the UE 100. Also, the service server 250 may provide the edge data network 200 with a service or data required for the UE 100 to drive (or, execute) the application client.

The service server 250 may be operated or managed by a content provider providing content to the UE 100.

Hereinafter, examples in which software packages that perform a virtualized radio access network (vRAN) function, an MEC function, and an UPF function according to the disclosure are executed will now be described. Throughout the specification, the term "package" may be interchangeably used with the term "software package."

Figure 3:
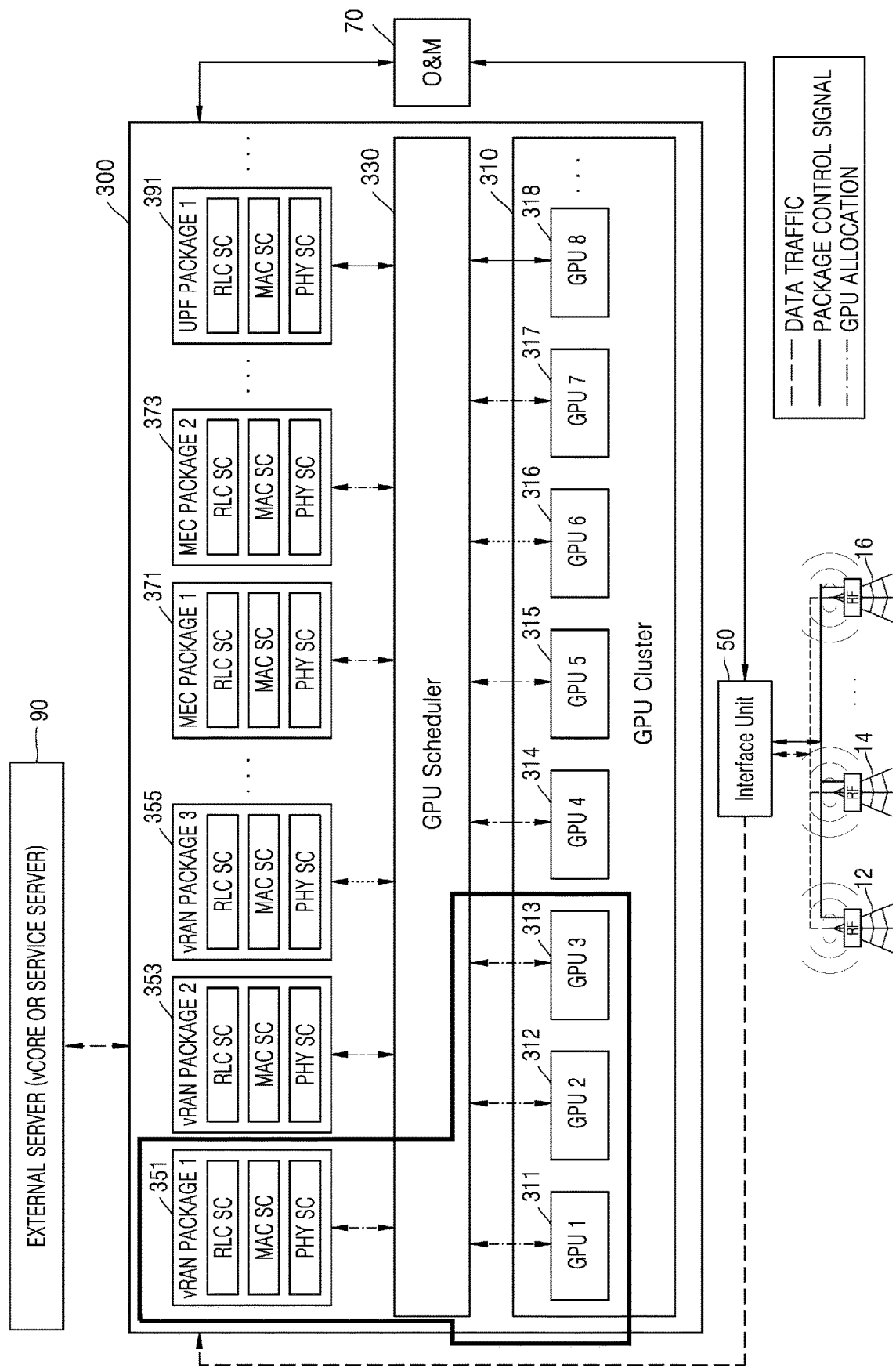
FIG. 3 is a block diagram of a wireless communication system including a network entity, which executes a software package according to an embodiment of the disclosure.

FIG. 3 is a block diagram of a wireless communication system including a network entity, which executes a software package according to an embodiment of the disclosure.

The network entity refers to an entity constituting a network, and for example, a core network (CN) consists of entities such as a mobility management entity (MME), a policy and charging rules function (PCRF), a service gateway (S-GW), a packet gateway (P-GW), and the like so as to provide functions of packet routing, mobility management, authentication, an account, an access to an external network, and the like. Network entities such as a data center having various types of databases storing client profiles, an operations and maintenance (O&M) center, or the like may constitute an LTE network or an NR network.

Referring to FIG. 3, a wireless communication system that executes a software package may consist of a plurality of network entities, and the network entities may include a server 300, an O&M 70, an interface unit 50, an external server 90, an MEC server (not shown), and a plurality of BSs (Node Bs) 12, 14, and 16. A UE may be directly connected to a network entity or may be connected to another network entity via a BS.

The server 300 may be connected to the plurality of BSs 12, 14, and 16 of a cell site via the interface unit 50, and the O&M 70 may command the interface unit 50 to allocate traffic to each package, the traffic occurring in the plurality of BSs 12, 14, and 16.

The server 300 may include a graphics processing unit (GPU) cluster 310, a GPU scheduler 330, and software packages 351, 353, 355, 371, 373, and 391 (also referred to as the vRAN package1 351, the vRAN package2 353, and the vRAN package3 355, the MEC package1 371 and the MEC package2 373, and the UPF package1 391). In addition thereto, the server 300 may include hardware (a central processing unit (CPU), a random access memory (RAM), a field programmable gate array (FPGA), a network interface controller (NIC), storage, an application-specific integrated circuit (ASIC) or eASIC capable of driving software for executing a function of each software package, an operating system (OS), virtualization software, a component management (CM) package, or a virtualization master, but FIG. 3 does not illustrate them. According to an embodiment of the disclosure, the GPU cluster 310 may be included in hardware.

An OS may be driven in the hardware. The OS may manage the hardware and software (e.g., virtualization software) executed by the server 300. The virtualization software may logically divide a resource managed by the OS, and may allow a plurality of software components (SCs) to share the logically divided resource. An example of the virtualization software may include Kubernetes, and the SC may correspond to a container of the Kubernetes.

A CM package (not shown) monitors usage states of the software packages 351 to 391 running in the server 300. According to an embodiment of the disclosure, the CM package may monitor usage states of software packages by receiving vRAN package usage information from a vRAN package, by receiving UPF package usage information from a UPF package, and by receiving MEC package usage information from an MEC package, via an interface.

Also, the CM package may obtain hardware usage information about all software packages included in the server 300. The hardware usage information may include, for example, information about an allocation state with respect to a package, use or non-use, a core load state, the number of processing cycles per core, or the like about each of hardware components including a CPU, a RAM, an FPGA, a GPU, a NIC, a storage, an ASIC, an eASIC, and the like, and may include same information as resource information included each package usage information.

A resource is an element used in executing the software packages 351 to 391. For example, the resource may include hardware (not shown), the GPU cluster 310, and the like, but this is merely an example and the resource is not limited to the example.

The logical division of the resource may be performed by distributing, through a switch, a physical communication line connecting the resource to the plurality of SCs. A SC indicates a component to be used as a separate server by collecting libraries or applications that are required to perform a particular function, and may be generated or removed in a unit of a package. The package is a minimum unit that shares one IP and may include one or more SCs.

According to an embodiment of the disclosure, the SC may be used to perform an NF. The NF according to an embodiment of the disclosure may refer to a function of forwarding traffic back and forth between devices existing over a network, and processing occurred traffic, and may include a radio access network (RAN) function, a UPF function, and an MEC function. The RAN function may correspond to a RAN function described above with reference to FIG. 1, and the MEC function may correspond to an edge data network function described above with reference to FIG. 2. Also, as described above, the UPF function serves as a gateway for delivering data transmitted or received to or from a UE, by providing a data path (or, a data plane) between the UE and an edge data network or between the UE and a service server.

The software package refers to a set of SCs capable of performing functions implemented as hardware, and may include the vRAN package1 351, the vRAN package2 353, and the vRAN package3 355, the MEC package1 371 and the MEC package2 373, and the UPF package1 391.

An SC is a physical binary file obtained by modularizing a frequently-used function, and in other words, the SC indicates a unit to be re-used as a capsulized software part. The SC may be stored as an application with an executable file (e.g., when generated by C code) or with code (e.g., when generated by Python) in a storage such as a hard disk drive (HDD), a solid-state drive (SDD), or the like, and may operate.

The software package may indicate a container for grouping unified modeling language (UML) elements with a relation into one group, and may be managed as one application of a set of at least one SC.

In FIG. 3, traffic flows of user plane data and control plane data for using each package are marked using a dotted line, flows of control signals for executing a software package according to an embodiment of the disclosure are marked using a full line, and GPUs allocated to each software package so as to process a task operated in each software package are marked using a separate dotted line.

The task operated in each package is a task performed by an SC of each package, and may indicate a procedure of generating output data by processing input data according to preset code.

The server 300 according to an embodiment of the disclosure may perform at least some of RAN functions used to be performed by a BS. The RAN functions may include, for example, a PDCP layer function, an RLC layer function, a MAC layer function, and a PHY layer function, but these are merely an example and thus, the RAN functions are not limited thereto.

Accordingly, a radio transceiver including a RF device may exist in each of the plurality of BSs 12, 14, and 16 of the cell site, and the RAN functions except for functions performed by the plurality of BSs 12, 14, and 16 may be performed by the server 300. For example, a PHY SC, a MAC SC, and an RLC SC may be generated in the server 300, and the PHY SC, the MAC SC, and the RLC SC may respectively perform the PHY layer function, the MAC layer function, and the RLC layer function. However, these are merely an example, and RAN functions performed by the server 300 are not limited thereto.

According to an embodiment of the disclosure, the PHY SC, the MAC SC, and the RLC SC may be included in one vRAN package (e.g., the vRAN package1 351). The vRAN package1 351 is a minimum unit that may include one or more SCs, each performing a RAN function. The vRAN package1 351 may be configured of instructions allowing RAN functions to be virtualized and then performed, the RAN functions being used to be performed by a hardware device according to the related art, and an SC may be removed or generated in a unit of the vRAN package1 351.

The vRAN package1 351 may provide vRAN package information to the GPU scheduler 330. The vRAN package information may include traffic information and traffic processing information about traffic occurring in the plurality of BSs 12, 14, and 16. Here, the traffic refers to a data flow passing through a communication network in a predefined time. According to an embodiment of the disclosure, the traffic may include a data flow between a UE and a BS (e.g., the BS 12), and may be indicated as a data rate per unit time.

The traffic may occur in a procedure in which a UE accessed a BS (e.g., the BS 12) executes an application. The application indicates an application program driven for a particular application service in a device such as a UE, and a plurality of applications may be driven in the UE. At least one of the applications may use an MEC service.

vRAN traffic information refers to information capable of directly or indirectly indicating an amount and a characteristic of traffic. The vRAN traffic information may include information about the number of cells processed by a vRAN package, a traffic processing speed (e.g., bps) per cell, the number of UEs connected to a BS, a bandwidth allocated to the BS, a spectrum sharing ratio between different wireless communication technologies, DL and UL processing times (DL/UL latency), the number of layers according to multiple-input and multiple-output (MIMO) antenna of each BS, a resource usage amount (e.g., a percentage of physical resource block (PRB) usage) by each BS, the frequency of handover of a UE, or the like. As another example, the vRAN traffic information may include a type of a service causing the traffic, a frequency band in which the traffic occurs, a type of a wireless communication system (e.g., an NR or an LTE) in which the traffic occurs, or the like.

Also, vRAN traffic processing information refers to information about a procedure of processing traffic, according to a RAN function. For example, the vRAN traffic processing information may include vRAN resource information used in processing traffic occurring in a plurality of BSs.

The vRAN resource information may directly or indirectly indicate a hardware resource used in processing vRAN traffic. The vRAN resource information may include a type of hardware allocated to a vRAN package, a ratio of a hardware core used in processing the vRAN traffic to hardware cores allocated to the vRAN package, the number of clock cycles used in processing the vRAN traffic compared to a maximum hardware core clock cycle, a size of a memory allocated to the vRAN package so as to process the vRAN traffic, or the like. According to an embodiment of the disclosure, the vRAN resource information may include information about a GPU resource used by the vRAN package. For example, identification information of a GPU allocated to the vRAN package, a ratio of a core used in processing the vRAN traffic to GPU cores allocated to the vRAN package, the number of clock cycles used in processing the vRAN traffic compared to a maximum GPU core clock cycle, and the like. However, this is merely an example, and examples of the vRAN traffic information or the vRAN resource information are not limited thereto.

Also, the vRAN package information may include information about a workload of modules constituting the vRAN package and requirements (e.g., a latency requirement) that should be satisfied in a software package.

The vRAN package information may be received by the vRAN package1 351 via the interface unit 50 from the plurality of BSs 12, 14, and 16, and according to another embodiment of the disclosure, the vRAN package information may be received from the OS in the server 300 or another external device. For example, the traffic information in the vRAN package information may be received from the plurality of BSs 12, 14, and 16. Also, resource information in the vRAN package information may be received from the OS in the server 300. However, this is merely an example, and a method, performed by the vRAN package1 351, of receiving the vRAN package information is not limited thereto. As another example, the vRAN package information may be obtained as a result of applying, by the vRAN package1 351, a statistics method (e.g., a calculation method such as an average, variance, or the like) to pre-obtained vRAN package information.

The vRAN package1 351 may deliver the obtained vRAN package information to the GPU scheduler 330. The GPU scheduler 330 will be described below.

The vRAN package1 351 may forward, to the MEC package1 371 via the UPF package1 391, traffic that occurs due to execution of an application using an MEC service from among forwarded traffic.

The server 300 according to an embodiment of the disclosure may perform at least some of UPF functions used to be performed by a core network. The UPF functions may include a management/control function and a user plane processing function, and a management/control SC and a user plane processing SC may be generated in the server 300 so as to respectively perform the aforementioned functions. However, these are merely an example, and thus, the UPF functions performed by the server 300 are not limited thereto.

According to an embodiment of the disclosure, the management/control SC and the user plane processing SC may be included in one UPF package (e.g., the UPF package1 391). Here, user plane data transmitted from the vRAN package1 351 may be processed by the UPF package1 391 and then may be transmitted to an MEC package (e.g., the MEC package1 371).

The UPF package1 391 may provide UPF package information to the GPU scheduler 330. The UPF package information may refer to information about processing of user plane data transmitted from the vRAN package1 351 or the MEC package1 371, and may include information about the number of UEs/sessions connected to a vRAN package, a UPF traffic processing rate (e.g., a packet per second), or the like.

The UPF package information may include, for example, UPF resource information used in processing the user plane data.

The UPF resource information may directly or indirectly indicate a hardware resource used in processing the user plane data, and for example, may include a type of hardware allocated to a UPF package, a ratio of a hardware core used in processing traffic to hardware cores allocated to the UPF package, the number of clock cycles used in processing the traffic compared to a maximum hardware core clock cycle, a size of a memory allocated to the UPF package so as to process the traffic, or the like.

According to an embodiment of the disclosure, the UPF resource information may include information about a GPU resource used by the UPF package. For example, identification information of a GPU allocated to the UPF package, a ratio of a core used in processing the UPF traffic to GPU cores allocated to the UPF package, the number of clock cycles used in processing the UPF traffic compared to a maximum GPU core clock cycle, and the like. However, this is merely an example, and examples of the UPF package information or the UPF resource information are not limited thereto.

Also, the UPF package information may include information about a workload of modules constituting the UPF package and requirements (e.g., a latency requirement) that should be satisfied in a software package.

The UPF package information may be received from the OS in the server 300 or another external device. For example, user plane traffic information in the UPF package information may be received from the vRAN package1 351. Also, resource information in the UPF package information may be received from the OS in the server 300. However, this is merely an example, and a method, performed by the UPF package1 391, of receiving the UPF package information is not limited thereto. As another example, the UPF package information may be obtained as a result of applying, by the UPF package1 391, a statistics method (e.g., a calculation method such as an average, variance, or the like) to pre-obtained UPF package information.

The UPF package1 391 may deliver the obtained UPF package information to the GPU scheduler 330.

An MEC package (e.g., the MEC package1 371) may execute an edge application, and may process traffic occurrence due to execution of the edge application or traffic received in relation to the edge application. The edge application may be executed on an edge data network, and the edge data network may be placed in a BS of a 3GPP network to which a UE is connected or at a location geographically close to the BS, and may provide content whose part is equal to content provided by the external server 90. Traffic that does not use an MEC service from among the traffic forwarded to the vRAN package1 351 may be forwarded to another server outside the server 300, and the disclosure does not provide descriptions of a method by which the other server outside the server 300 processes traffic.

The MEC package1 371 may provide the MEC package information to the GPU scheduler 330. The MEC package information may indicate information about services provided via edge applications, and may include information about the number of the edge applications, the number of UEs connected to the edge applications, response times of the edge applications, types of the services, time periods of using the services, an amount of traffic occurrence due to usage of the services, locations of the UEs using the services, or the like.

The MEC package information may include, for example, MEC resource information used in processing edge application data.

The MEC resource information may refer to information capable of directly or indirectly indicating a hardware resource used in processing the edge application data, and may include a type of hardware allocated to an MEC package, a ratio of a hardware core used in processing traffic to hardware cores allocated to the MEC package, the number of clock cycles used in processing the traffic compared to a maximum hardware core clock cycle, a size of a memory allocated to the MEC package so as to process the traffic, or the like.

According to an embodiment of the disclosure, the MEC resource information may include information about a GPU resource used by the MEC package. For example, identification information of a GPU allocated to the MEC package, a ratio of a core used in processing the MEC traffic to GPU cores allocated to the MEC package, the number of clock cycles used in processing the MEC traffic compared to a maximum GPU core clock cycle, and the like. However, this is merely an example, and examples of the MEC package information or the MEC resource information are not limited thereto.

Also, the MEC package information may include information about a workload of modules constituting the MEC package and requirements (e.g., a latency requirement) that should be satisfied in a software package.

The MEC package information may be received from the OS in the server 300 or another external device. Also, resource information in the MEC package information may be received from the OS in the server 300. However, this is merely an example, and a method, performed by the MEC package1 371, of receiving the MEC package information is not limited thereto. As another example, the MEC package information may be obtained as a result of applying, by the MEC package1 371, a statistics method (e.g., a calculation method such as an average, variance, or the like) to pre-obtained MEC package information.

The MEC package1 371 may deliver the obtained MEC package information to the GPU scheduler 330.

The GPU cluster 310 may indicate a set of GPUs 311 to 318 being allocable to software packages, and may be included in hardware (not shown) of the server 300.

A GPU was developed to process complicated three-dimensional (3D) graphics through a parallel-computation specified structure, but, recently, a general purpose computing on graphics processing unit (GPGPU) technology is used in which a processing capability of a GPU is used not only in processing graphics but also in a general operation. In a case where a large volume of vector data is computed, when computations of each row and each column are parallel processed, the computations are faster than serial processing using a CPU, such that technologies of using the GPU in deep learning are being developed.

As a bandwidth is increased and an antenna technology such as MIMO is applied in the 5G NR, hardware acceleration is requested for physical layer calculation and workload scheduling. In general, the hardware acceleration is performed using the GPU. The GPU may use more chip areas for computation than the GPU, and may be optimized for workload scheduling of high-performance computing.

In vRAN, an amount of traffic is increased due to an increase in machine-to-machine data, such that there is a need to efficiently control a network resource. Also, in order to execute various MEC services and to satisfy low latency requested by the MEC services, there is a demand for a processor with higher performance and effective scheduling of the network resource.

By using a hardware virtualization technology, a plurality of virtual machines (e.g., a software package) may share one physical hardware embedded in a server. As the GPU has multiple cores as described above, the GPU is advantageous in parallel processing and has a low price per unit core, compared to the CPU. Therefore, the GPU is advantageous to be used as a resource for cloud computing, but the cloud computing is a technology based on virtualization and thus, the GPU has to be virtualized to be used as a complete cloud resource.

When a hardware resource is virtualized, a preset percentage (or a computation amount) of each hardware resource may be used to process a task of a particular software package. When a hardware resource optimized for necessity of each package is allocated by using such feature, a system resource may be further efficiently used, system scalability may be increased, and operation costs may be reduced.

When the GPU is virtualized, cores of the GPU may be distributed and allocated to multiple software packages, such that the software packages may be processed in parallel. For example, parallelism in which a plurality of vRAN packages are processed in one GPU is possible. Alternatively, parallelism of modules (e.g., channel estimation in PUSCH, equalizer, DeMod, DeScram, LDPC, BC Con+ CRC modules) of a vRAN package may be possible in one GPU.

The GPU scheduler 330 refers to a set of instructions for determining the number of SCs included in the vRAN packages 351 to 355, the UPF package1 391, or the MEC packages 371 to 373 and a resource allocated to an SC or a GPU for executing a package performing an MEC function or a vRAN function, the GPU being from among the GPUs 311 to 318 included in the GPU cluster 310.

Referring to FIG. 3, the GPU1 311, the GPU2 312, and the GPU3 313 are allocated to the vRAN package1 351, the GPU4 314 and the GPU5 315 are allocated to the vRAN package2 353, the GPU6 316 is allocated to the vRAN package3 355, the GPU7 317 is allocated to the MEC package1 371 and the MEC package2 373, and the GPU8 318 is allocated to the UPF package1 391.

According to another embodiment of the disclosure, 100% of the GPU1 311, 80% of the GPU2 312, and 70% of the GPU3 313 may be allocated to the vRAN package1 351, 100% of the GPU4 314 and 100% of the GPU5 315 may be allocated to the vRAN package2 353, 30% of the GPU3 313 and 100% of the GPU6 316 are allocated to the vRAN package3 355, 20% of the GPU2 312 and 30% of the GPU3 313 may be allocated to the MEC package1 371, 100% of the GPU7 317 may be allocated to the MEC package2 373, and 100% of the GPU8 318 may be allocated to the UPF package1 391. That is, a certain percentage of at least one GPU may be allocated to each software package.

The GPU scheduler 330 may receive the vRAN package information from the vRAN package1 351, the vRAN package2 353, and the vRAN package3 355, may receive the UPF package information from the UPF package1 391, and may receive the MEC package information from the MEC package1 371 and the MEC package2 373. As another example, the GPU scheduler 330 may obtain package information from an external device.

The GPU scheduler 330 may determine whether to change a GPU usage profile of each of software packages and determine a new GPU usage profile of each of the software packages, based on package information of each of the software packages and GPU state information of GPUs.

The package information may include GPU usage information of each of the software packages and a workload of modules constituting each of the software packages, i.e., GPU usage amount information and requirement of each software package.

The GPU state information refers to information about a usage state of each of the GPUs 311 to 318 included in the GPU cluster 310. According to an embodiment of the disclosure, GPU state information may include information about use or non-use of each of GPUs constituting a GPU cluster, a core usage amount, a GPU operation ratio, a GPU usage location (information of a sector being used, streaming multiprocessor (SM) information, or the like), and power consumption.

The GPU scheduler 330 may obtain the GPU state information from hardware of the GPU cluster 310, and may store, update, and manage the obtained GPU state information.

The GPU usage profile of each of the software packages refers to information of at least one GPU used after being allocated to each of the software packages. According to an embodiment of the disclosure, the GPU usage profile of each of the software packages may include information about the number of at least one GPU used by each of the software packages (or, allocated to each of the software packages), identification (ID) information of the at least one GPU (e.g., ID of the at least one GPU) used by each of the software packages, a usage ratio (e.g., a core usage ratio) of the at least one GPU used by each of the software packages, and an allocation location (e.g., sector information, SM information, or the like) of the at least one GPU used by each of the software packages.

The GPU scheduler 330 may determine the GPU usage profile of each of the software packages, and may store, update, and manage the GPU usage profile. Here, the GPU scheduler 330 may separately manage respective GPU usage profiles of the software packages, or may integrate GPU usage profiles of all of the software packages and manage the integrated GPU usage profile.

For example, when the vRAN package3 355 is executed in the currently-allocated GPU3 313 and does not satisfy requested latency, or when GPUs currently allocated to packages are all used and power consumption requested by a system is not satisfied, the GPU scheduler 330 may determine to change the respective GPU usage profiles of the software packages. Also, the GPU scheduler 330 may determine a new GPU usage profile of each of the software packages.

In this regard, the new GPU usage profile may be determined based on package information of the software packages, and GPU state information and power consumption requirements of GPUs included in a GPU cluster.

According to an embodiment of the disclosure, the GPU scheduler 330 may allocate, to a software package, a certain percentage of each of at least one GPU from among the GPUs 311 to 318 constituting the GPU cluster 310. For example, it is assumed a case where, when 100% of the GPU3 313 is currently allocated to the vRAN package3 355 and the vRAN package3 355 is executed by using allocated 100% of the GPU3 313, a processing time of the vRAN package3 355 is longer than latency requested by a package. In this case, in order to decrease a package processing time, the GPU scheduler 330 may determine tasks of the vRAN package3 355 to be processed in a distributed manner by additionally allocating 50% of the GPU4 314 to the vRAN package3 355 or allocating 70% of the GPU4 314 and 80% of the GPU5 315.

A detailed method of determining whether to change a GPU allocated to software packages and a detailed method of allocating a new GPU to the software packages will be described below.

In a case of a software package to which a new GPU is allocated, hardware offloading may be requested to migrate a task being executed in a previously-allocated GPU to a newly-allocated GPU. The offloading indicates an operation of migrating a processing point of a network function so as to allow the package having been executed in a particular hardware component (HC) to be executed in the different HC, and when offloading is performed, a function of the package which has been performed in a previously-allocated HC is now performed in a newly-allocated HC.

For example, the server 300 may migrate a vRAN function, a UPF function, and an MEC function, which have been processed by using the GPU1 311, to different HCs such as the GPU2 312 and the GPU3 313 and may process the functions. As another example, the server 300 may change a HC where each package is executed, based on vRAN package usage information, UPF package usage information, MEC package usage information, and the like.

A process of changing the HC where each package is executed may include scale-out, scale-in, scale-up, and scale-down.

The scale-out indicates a function of generating a new package by adding a resource instance (e.g., a HC) to be allocated to a SC, and the scale-in indicates a function of deleting a package by removing a resource instance allocated to the SC. The scale-up indicates a function of increasing a resource allocated to the SC, and the scale-down indicates a function of decreasing a resource allocated to the SC.

Package scaling may refer to a process of newly allocating or changing a resource with respect to the SC, and may processes of scale-out, scale-in, scale-up, and scale-down.

For example, when the server 300 determines hardware offloading to change a HC for executing the vRAN package1 351 from the GPU1 311 through the GPU3 313 to the GPU1 311 and the GPU2 312, the server 300 may generate a new vRAN package4 (not shown) by scaling-out instances equal to the SC included in the vRAN package1 351. When the vRAN package4 is generated, the server 300 may change a path of data traffic to the vRAN package4, and may delete the vRAN package1 351 by removing instances by scaling-in the instances of the SC included in the vRAN package1 351. When the vRAN package1 351 is deleted, the GPU1 311 to the GPU3 313 allocated to the vRAN package1 351 may be released and then the server 300 may allocate the GPU1 311 and the GPU2 312 to the vRAN package4.

Figure 4:
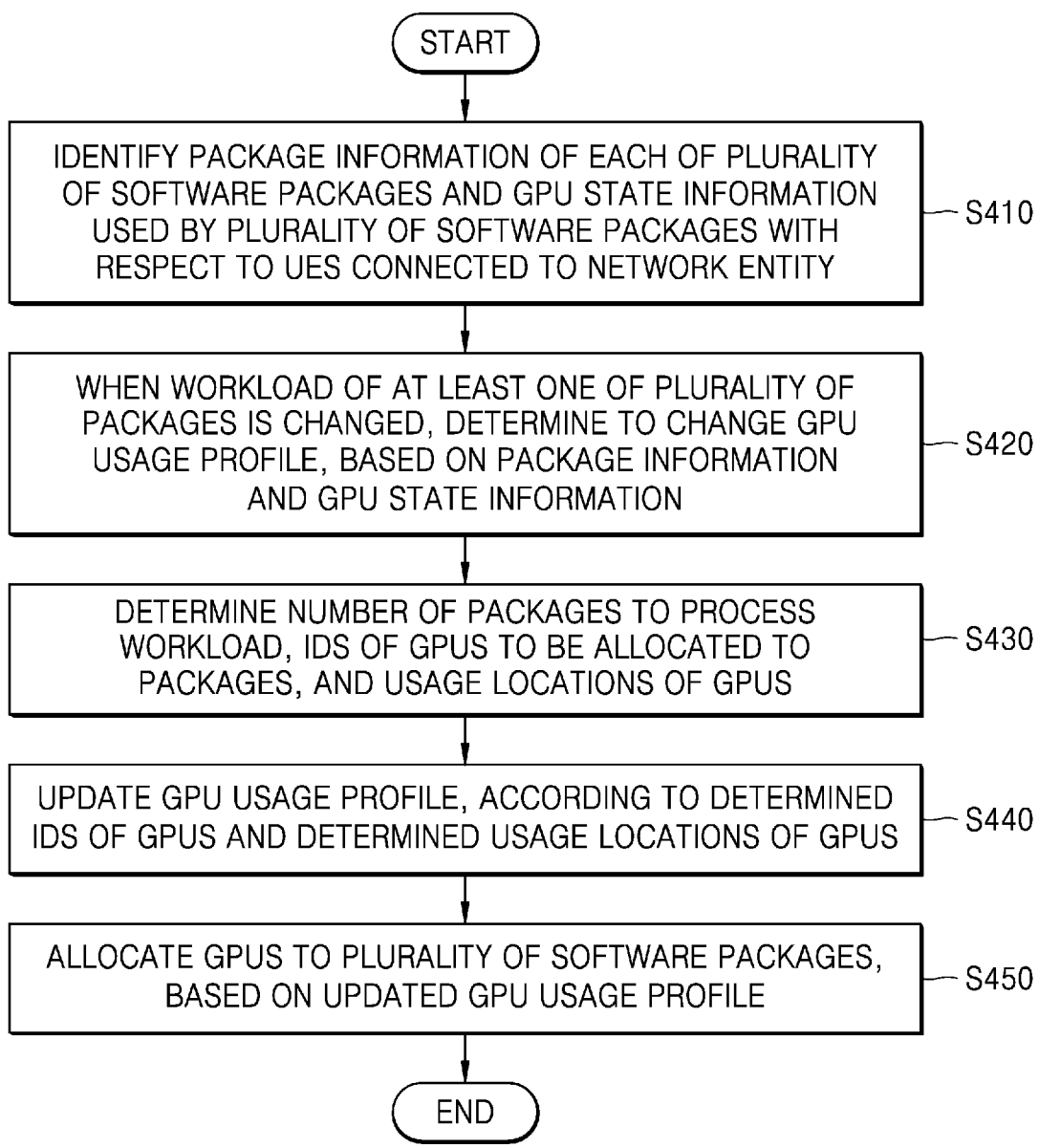
FIG. 4 is a flowchart for describing a method by which a network entity allocates a graphics processing unit (GPU) to software packages in a wireless communication system according to an embodiment of the disclosure.

FIG. 4 is a flowchart for describing a method by which a network entity allocates a GPU to software packages in a wireless communication system according to an embodiment of the disclosure.

Referring to FIG. 4, in operation S410, the network entity may identify package information of each of a plurality of software packages and GPU state information used by the plurality of software packages with respect to UEs connected to the network entity.

A software package is a minimum unit enabled to include one or more SCs performing NFs and sharing one IP, and an SC may be generated or removed in a unit of a package.

For example, the network entity may include a GPU scheduler, and the GPU scheduler may obtain and identify package information of each of vRAN packages, UPF packages, or MEC packages with respect to the UEs accessing a plurality of BSs connected to the network entity and GPU state information of each of GPUs included in a GPU cluster.

The plurality of software packages with respect to the UEs connected to the network entity may include a vRAN package, an UPF package, or an MEC package. The vRAN package may include an SC to perform a RAN function, the UPF package may include an SC to perform an UPF function, and the MEC package may include an SC to perform an MEC function.

The package information may include vRAN package information, UPF package information, or MEC package information.

For example, the vRAN package information may include vRAN resource information used in processing traffic occurring in the plurality of BSs. The vRAN resource information may directly or indirectly indicate a hardware resource used in processing vRAN traffic. The vRAN resource information may include a type of hardware allocated to a vRAN package, a ratio of a hardware core used in processing the vRAN traffic to hardware cores allocated to the vRAN package, the number of clock cycles used in processing the vRAN traffic compared to a maximum hardware core clock cycle, a size of a memory allocated to the vRAN package so as to process the vRAN traffic, or the like.

The UPF package information may include, for example, UPF resource information used in processing the user plane data. The UPF resource information may directly or indirectly indicate a hardware resource used in processing the user plane data, and for example, may include a type of hardware allocated to a UPF package, a ratio of a hardware core used in processing traffic to hardware cores allocated to the UPF package, the number of clock cycles used in processing the traffic compared to a maximum hardware core clock cycle, a size of a memory allocated to the UPF package so as to process the traffic, or the like.

The MEC package information may include, for example, MEC resource information used in processing edge application data. The MEC resource information may refer to information capable of directly or indirectly indicating a hardware resource used in processing the edge application data, and may include a type of hardware allocated to an MEC package, a ratio of a hardware core used in processing traffic to hardware cores allocated to the MEC package, the number of clock cycles used in processing the traffic compared to a maximum hardware core clock cycle, a size of a memory allocated to the MEC package so as to process the traffic, or the like.

Also, the package information may include information of at least one BS processing each software package, a workload of modules constituting each of the software packages, i.e., GPU usage amount information, and requirement of each software package. The GPU state information may include information about use or non-use of each of the GPUs constituting the GPU cluster, a core usage amount, a GPU operation ratio, a GPU usage location (information of a sector being used, SM information, or the like), and power consumption. However, this is merely an example, and examples of the package information or the GPU state information are not limited thereto.

Each of packages may periodically deliver the package information or deliver the package information in response to occurrence of a preset event to the GPU scheduler, and the network entity may monitor GPU usage states of the respective packages, based on the package information. Also, the network entity may collect a plurality of pieces of resource information included in a plurality of pieces of the package information, thereby separately managing GPU usage information used by all packages. The GPU usage information may include, for example, information about an allocation state with respect to a package, use or non-use, a core load state, the number of processing cycles per core, or the like about each of GPUs.

In operation S420, when a workload of at least one of the plurality of packages is changed, the network entity may determine to change a GPU usage profile, based on the package information and the GPU state information.

The GPU usage profile may include information about the number of at least one GPU used by each of the software packages (or, allocated to each of the software packages), ID information of the at least one GPU (e.g., ID of the at least one GPU) used by each of the software packages, a usage ratio (e.g., a core usage ratio) of the at least one GPU used by each of the software packages, and an allocation location (e.g., sector information, SM information, or the like) of the at least one GPU used by each of the software packages. For example, in a case where a first software package is a vRAN package to process traffic of first to fifth BSs, and the first software package uses 80% of a first GPU, a GPU usage profile of the first software package may include information about the number of GPUs (e.g., 1) used by the first software package, GPU ID information (e.g., ID of the first GPU), and a GPU usage amount (e.g., 80%).

When a workload of the first to fifth BSs is increased, the network entity may determine to change the GPU usage profile of the first software package so as to satisfy a latency requirement of the first software package by additionally allocating a GPU to the first software package.

According to an embodiment of the disclosure, when the network entity compares a processing time of the first software package for which a workload is changed with a preset threshold value (e.g., T_latency), and the processing time of the first software package with a current GPU usage profile does not satisfy latency (T_latency) requested by the first software package, the network entity may determine to change the GPU usage profile.

When the processing time of the first software package is longer than T_latency, a currently-allocated GPU cannot satisfy latency requested by the first software package, such that it is requested to increase a processing speed by additionally allocating a GPU or to distribute a workload by adding a package for processing the workload.

Latency requested by a software package may vary according to a scenario (or, a data format) for providing a service. For example, a latency requirement condition of enhanced mobile broad-band (eMBB), massive machine type communication (mMTC), enhanced machine type communication (eMTC), or ultra-reliable low latency communication (URLLC) may vary according to their characteristics. In order to implement automation of all URLLC-applied fields including building automation, a futuristic factory, eHealth, a smart city, power distribution, smart farming, or the like, end-to-end (E2E) latency performance of at least 0.5 ms has to be satisfied.

Alternatively, latency requested by a software package may be determined based on a service characteristic. For example, for an augmented reality (AR) service or a virtual reality (VR) service, latency of at most 1 ms is ideal, in consideration of an audiovisual response speed of human, and for an autonomous driving service or a drone service, low latency of at most 5 ms is requested because a network delay can cause a fatal accident.

As described above, because a UE may use various services, and a data format processed therefor may vary, latency according to a data format requesting smallest (shortest) latency from among data formats (e.g., eMBB, mMTC, eMTC, and URLLC) processible by a software package may be determined to be requested latency of the package.

Such latency requirements may be transmitted to a system from the UE via a BS, or the system may determine a latency requirement, based on a characteristic of a service used by the UE.

According to an embodiment of the disclosure, when the network entity compares power consumption by GPUs, which are included in a GPU cluster and are used by software packages, with a preset threshold value (e.g., T_power), and a current GPU usage profile cannot satisfy threshold power consumption by a system, the network entity may determine to change the GPU usage profile of the software packages. When the power consumption by the GPUs is greater than T_power, the threshold power consumption by the system cannot be satisfied, and thus, it is requested to reduce the power consumption by decreasing the number of the GPUs used in the system. Here, T_power refers to a value set based on performance of the system and may be stored in the system.

For example, in a case where a first software package uses 30% of a first GPU, a second software package uses 40% of a second GPU, and power consumption used by the first GPU and the second GPU exceeds T_power that is a power consumption requirement of the system, in order to satisfy the power consumption requirement of the system, the network entity may change a GPU usage profile of the second software package so as to allow the second software package to be executed in the first GPU. In this case, operation of the second GPU is stopped, and thus, power consumption used by all GPUs is reduced, such that the power consumption may become smaller than T_power that is the power consumption requirement of the system.

Therefore, in order to satisfy the power consumption requirement of the system by decreasing the number of the GPUs used by the first software package, the network entity may determine to change the GPU usage profile of the first software package.

In operation S430, the network entity may determine the number of packages to process the workload, IDs of GPUs to be allocated to the packages, and usage locations of the GPUs, based on the package information and the GPU state information.

According to an embodiment of the disclosure, the network entity may determine a GPU allocation mode, based on the obtained package information and the obtained GPU state information. Here, the GPU allocation mode may include a latency priority mode or a power priority mode.

A detailed method of determining whether to change a GPU and a detailed method of determining the GPU allocation mode will be described below.

According to an embodiment of the disclosure, the network entity may include a GPU scheduler, and the GPU scheduler may determine whether to additionally generate a software package to process a workload, based on the package information and the GPU state information.

For example, when a workload of a first BS to a fifth BS which is processed in a first software package is increased, in order to satisfy a latency requirement of the first software package, the network entity may determine to generate a second software package capable of processing the workload of the first software package in a distributed manner (e.g., the first software package processes traffic of the first BS to a third BS, and the second software package processes traffic of a fourth BS and the fifth BS).

According to an embodiment of the disclosure, the GPU scheduler of the network entity may determine the IDs of the GPUs to be allocated to the software packages to process the workload, based on the package information and the GPU state information, and may determine the usage locations (a sector or SM) of the GPUs.

According to an embodiment of the disclosure, the network entity may determine the number of GPUs to be allocated to the first software package and GPUs to be allocated to the first software package, according to the GPU allocation mode.

According to an embodiment of the disclosure, the network entity may priorly allocate a GPU to a vRAN package and may allocate remaining GPUs to an MEC package.

A detailed method of determining the number of GPUs to be allocated to software packages and GPUs to be allocated and a detailed method of priorly allocating a GPU to a vRAN package, according to the GPU allocation mode, will be described below.

In operation S440, the network entity may update the GPU usage profile, according to the determined IDs of the GPUs and the determined usage locations of the GPUs.

As described above, the GPU usage profile may include information about the number of at least one GPU used by each of the software packages (or, allocated to each of the software packages), ID information of the at least one GPU (e.g., ID of the at least one GPU) used by each of the software packages, a usage ratio (e.g., a core usage ratio) of the at least one GPU used by each of the software packages, and an allocation location (e.g., sector information, SM information, or the like) of the at least one GPU used by each of the software packages.

In operation S450, the network entity may allocate the GPUs to the plurality of software packages, based on the updated GPU usage profile.

In operation S430, when the number of packages to process the workload is increased, the GPU scheduler may request a virtualization master to generate the second software package capable of processing the workload of the first software package in a distributed manner.

In addition, the GPU scheduler may request the virtualization master to generate a new software package capable of processing tasks operating in the first software package. When obtaining the request of generating the new software package, the virtualization master may generate a third software package by scaling-out instances equal to an SC included in the first software package.

The GPU scheduler may request the virtualization master to generate a package and allocate a GPU to the generated package. When obtaining the request of allocating the GPU, the virtualization master may allocate the GPU to the newly-generated second and third software packages, according to the GPU usage profile updated in operation S440.

According to an embodiment of the disclosure, the GPU scheduler may deliver a request of allocating a new GPU to a CM package, and the CM package may deliver the request of generating a software package and the request of allocating a GPU to the virtualization master. Afterward, the network entity may migrate the tasks operating in the first software package to the second software package and the third software package, and may deliver a data path change request to an O&M (or an O&M package) so as to change a data path from the first software package to the second software package and the third software package. When the O&M obtains the data path change request, the O&M may communicate with the network entity and thus may transmit the data path change request to a plurality of BSs connected to the network entity.

In operation S430, when the number of packages to process the workload is not changed, the second software package is excluded from a target of generation, GPU allocation, or a path change.

A data path change is completed, the network entity deletes the first software package.

When the tasks operating in the first software package are migrated to the second software package, the CM package may request the virtualization master to delete the first software package. When the virtualization master obtains the request of deleting the first software package, the virtualization master may delete the first software package by removing instances by scaling-in the instances of the SC included in the first software package. When the first software package is deleted, HCs executing the first software package may be released, and other software package may use the released HCs.

FIG. 5 is a diagram for describing a method by which a network entity decreases latency when the network entity schedules a plurality of GPUs so as to process a plurality of software packages in a wireless communication system according to an embodiment of the disclosure.

Referring to FIG. 5, a GPU thread block (TB) for processing one software package consists of 16 cooperative thread arrays (CTAs), and a CTA indicates a TB that is a scheduling unit of a GPU.

A part (a) of FIG. 5 illustrates latency of a case where package1 and package2 are processed by one GPU (GPU1) according to an embodiment of the disclosure, a part (b) of FIG. 5 illustrates latency of a case where package1 is processed by GPU1 and package2 is processed by GPU2, and a part (c) of FIG. 5 illustrates latency of a case where package1 and package2 are simultaneously processed by GPU1 and GPU2. As described above, because processing of one package consists of 16 CTAs, 32 CTAs are required to process package1 and package2.

Comparing the case of a part (a) of FIG. 5 with the case of a part (b) of FIG. 5, latency of the case of a part (b) of FIG. 5 which uses two GPUs to process two packages (32 CTAs) is fast, compared to the case of a part (a) of FIG. 5 which uses one GPU to process two packages (32 CTAs). Therefore, in the case of a part (b) of FIG. 5, the number of packages that are simultaneously processed is increased, and thus, it is possible to obtain an effect in which latency of package2 is decreased compared to the case of a part (a) of FIG. 5. However, package1 does not have a gain in terms of latency, compared to the case of a part (a) of FIG. 5.

Unlike the case of a part (b) of FIG. 5, a part (c) of FIG. 5 illustrates latency of the case where package1 is priorly processed by GPU1 and GPU2, and after processing of package1 is ended, package2 is processed by GPU1 and GPU2. Comparing the case of a part (c) of FIG. 5 with the case of a part (b) of FIG. 5, in the case of a part (c) of FIG.

5, it is possible to obtain an effect in which latency of package1 is decreased compared to the case of a part (b) of FIG. 5.

Therefore, when comparing the case of a part (a) of FIG. 5 with the case of a part (c) of FIG. 5, in the case of a part (c) of FIG. 5, a larger number of GPUs are used, compared to the case of a part (a) of FIG. 5, such that it is possible to obtain an effect in which latency of both package1 and package2 is decreased.

Figure 6A:
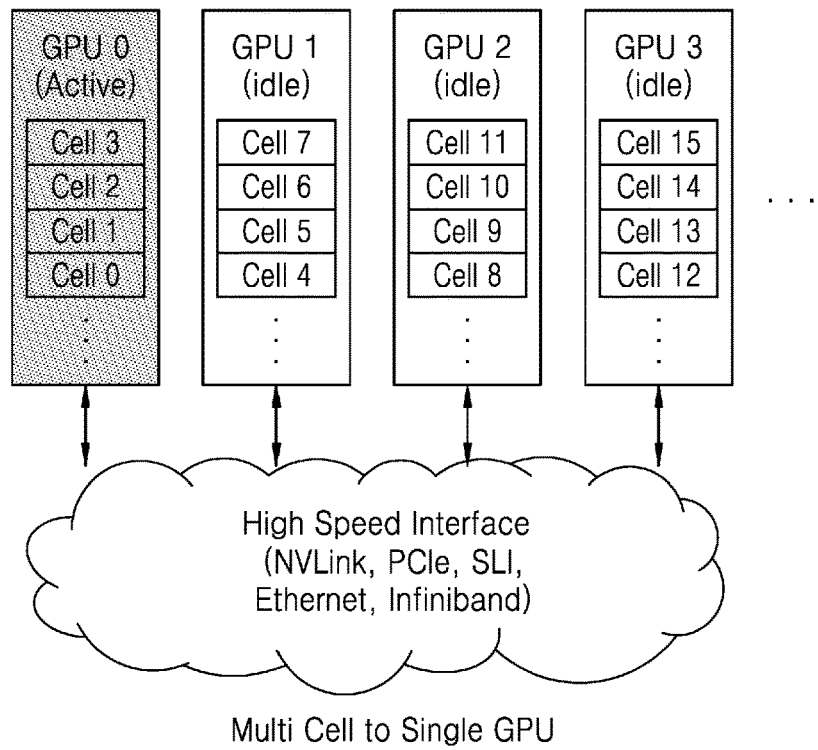
FIGS. 6A and 6B are a diagram for describing a method of reducing energy consumption when a plurality of software packages are processed by a plurality of GPUs in a wireless communication system according to various embodiments of the disclosure.
Figure 6B:
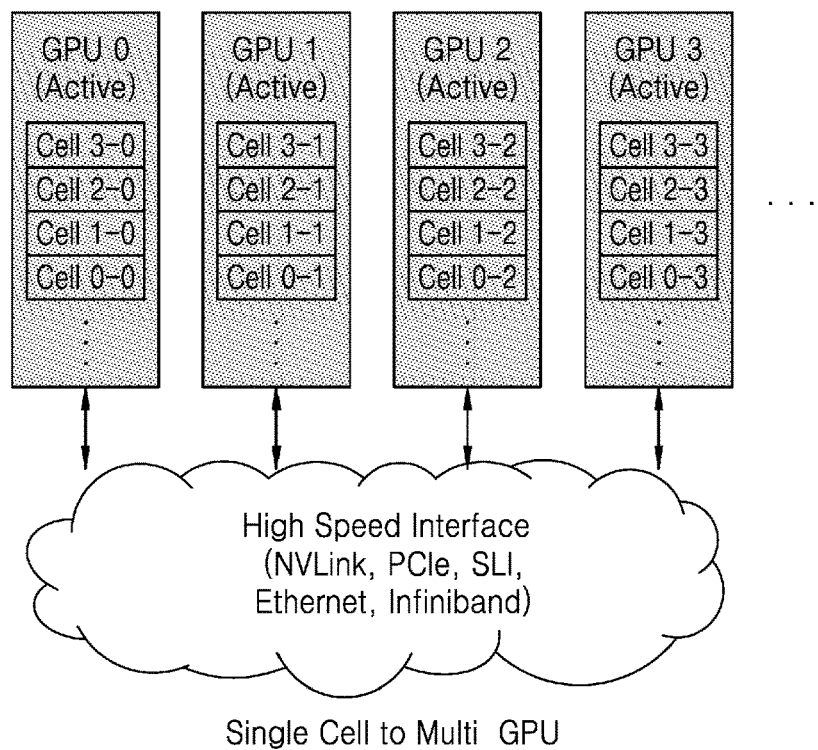

FIGS. 6A and 6B are a diagram for describing a method of reducing energy consumption when a plurality of software packages are processed by a plurality of GPUs in a wireless communication system according to various embodiments of the disclosure.

Referring to FIGS. 6A and 6B, each of the GPUs is connected to a high speed interface (e.g., NVLink, PCIe, SLI, Ethernet, Infiniband, etc.).

FIG. 6A illustrates a multi-GPU vRAN structure in which processing of one package is not divided and is allocated to one GPU, and FIG. 6B illustrates a multi-GPU vRAN structure in which processing of traffic of one cell is divided and allocated to N GPUs.

Assuming a case where package 0 to package 3, i.e., a total of four packages, are processed, FIG. 6A illustrates a case where the four packages are processed by GPU0, and FIG. 6B illustrates a case where processing of the four packages is divided and allocated to GPU0 to GPU3.

As described with reference to FIG. 5, compared to the case of FIG. 6A, in the case of FIG. 6B, it is possible to obtain an effect in which latency becomes short. On the other hand, in the case of FIG. 6A, only one GPU is activated, and thus, there is an advantage in terms of energy consumption, compared to the case of FIG. 6B.

Figure 7:
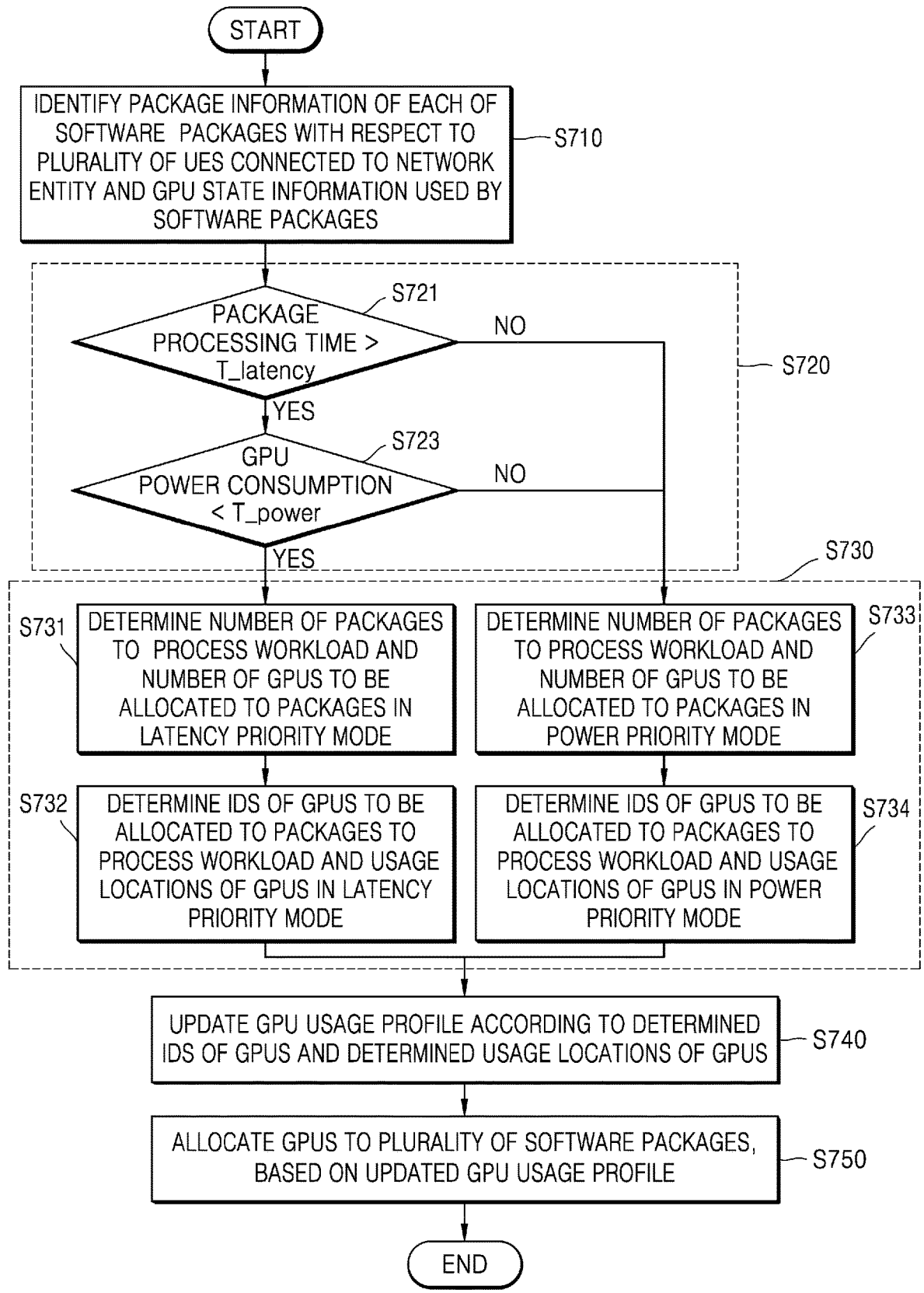
FIG. 7 is a flowchart of a method by which a network entity determines a GPU usage profile of software packages in a wireless communication system according to an embodiment of the disclosure.

FIG. 7 is a flowchart of a method by which a network entity determines a GPU usage profile of software packages in a wireless communication system according to an embodiment of the disclosure.

Referring to FIG. 7, according to an embodiment of the disclosure, the network entity may determine a GPU allocation mode, based on a factor that has a greater effect on operation of a system from among latency and power consumption, and may determine the number of GPUs to be allocated to each package, according to the GPU allocation mode.

According to an embodiment of the disclosure, the network entity may determine the GPU allocation mode, based on respective threshold values of a throughput requirement, a maximum available processing time, and a power consumption requirement of each of the software packages, and the GPU allocation mode may include a latency priority mode or a power priority mode.

In descriptions of FIG. 7, detailed descriptions that are redundant to those of FIG. 4 are not provided.

In operation S710, the network entity may identify package information of each of the software packages with respect to a plurality of UEs connected to the network entity and GPU state information used by the software packages.

The package information may include information of at least one BS processed by a software package, a workload of modules constituting each of the software packages, i.e., GPU usage amount information and requirement of each software package, and the GPU state information may include information about use or non-use of each of GPUs constituting a GPU cluster, a core usage amount, a GPU operation ratio, a GPU usage location (information of a sector being used, SM information, or the like), and power consumption. However, the examples above are merely an example, and the package information or the GPU state information is not limited to the examples.

Each of packages may periodically deliver the package information or deliver the package information in response to occurrence of a preset event to the GPU scheduler, and the network entity may monitor GPU usage states of the respective packages, based on the package information. Also, the network entity may collect a plurality of pieces of resource information included in a plurality of pieces of the package information, thereby separately managing GPU usage information used by all packages. The GPU usage information may include, for example, information about an allocation state with respect to a package, use or non-use, a core load state, the number of processing cycles per core, or the like about each of GPUs.

In operation S720, the network entity may determine the GPU allocation mode, based on the package information and the GPU state information.

According to an embodiment of the disclosure, when a workload of at least one of a plurality of packages is changed, the network entity may determine to change a GPU usage profile, based on the package information and the GPU state information, and may determine the GPU allocation mode. The determining of changing the GPU usage profile is described above with reference to operation S420, and thus, detailed descriptions thereof are not provided here.

The GPU usage profile of each of the software packages may include information about the number of at least one GPU used by each of the software packages (or, allocated to each of the software packages), ID information of the at least one GPU (e.g., ID of the at least one GPU) used by each of the software packages, a usage ratio (e.g., a core usage ratio) of the at least one GPU used by each of the software packages, and an allocation location (e.g., sector information, SM information, or the like) of the at least one GPU used by each of the software packages.

In operation S720, the network entity may determine a GPU allocation mode via operation S721 and operation S723. The network entity may compare a processing time of each of the plurality of software packages with a preset threshold value (e.g., T_latency) in operation S721, and may compare power consumption by GPUs with a preset threshold value (e.g., T_power) in operation S723.

A package latency requirement (T_latency) may be obtained from package information of a software package. The package latency requirement (T_latency) may refer to a requirement for a time in which processing of a corresponding package has to be completed so as to efficiently process and manage a plurality of packages, and may vary according to a scenario (or, a data format) for providing a service. Also, the package latency requirement (T_latency) may vary for each package and may be determined, in consideration of system performance.

Also, T_power that is the preset threshold value compared with the power consumption by the GPUs may indicate power consumption for stable operation of a system, and may be stored, in the network entity, as a value set by the system or the network entity, in consideration of system performance.

According to an embodiment of the disclosure, as a result of the determining in operation S721, when a processing time of a software package is greater than T_latency (does not satisfy a latency requirement), and as a result of the determining in operation S723, when the power consumption by the GPUs is less than T_power (satisfies a power consumption requirement), this corresponds to a case where the processing time of the software package can be decreased by using an additional GPU, and thus, the network entity may determine the GPU allocation mode to be a latency priority mode.

On the contrary, as the result of the determining in operation S721, when a required processing time of the software package is not greater than T_latency (satisfies the latency requirement), and as the result of the determining in operation S723, when the power consumption by the GPUs is not less than T_power (does not satisfy the power consumption requirement), the network entity may determine the GPU allocation mode to be a power priority mode.

When the GPU allocation mode is determined in operation S720, the network entity may determine the number of packages to process a workload and the number of GPUs to be allocated to the packages according to the GPU allocation mode, and may determine IDs of GPUs to be allocated to the packages to process the workload and usage locations of the GPUs.

In more detail, in operation S731 and operation S732, the network entity may determine the number of packages to process a workload and the number of GPUs to be allocated to the packages, and may determine IDs of the GPUs to be allocated to the packages to process the workload and usage locations of the GPUs, according to the latency priority mode. Alternatively, in operation S733 and operation S734, the network entity may determine the number of packages to process a workload and the number of GPUs to be allocated to the packages, and may determine IDs of the GPUs to be allocated to the packages to process the workload and usage locations of the GPUs, according to the power priority mode.

According to an embodiment of the disclosure, the network entity may determine the number of required GPUs, based on package information of a software package. For example, the network entity may obtain information of the number of CTAs constituting each of modules constituting the software package, and may determine, by using the information of the number of CTAs, the number of required GPUs for the software package.

In operation S740, the network entity may update the GPU usage profile according to the determined IDs of the GPUs and the determined usage locations of the GPUs.

In operation S750, the network entity may allocate the GPUs to the plurality of software packages, based on the updated GPU usage profile.

Operation S740 and operation S750 are described in operation S440 and operation S450 of FIG. 4, and thus, detailed descriptions thereof are not provided here.

Hereinafter, a detailed method of determining a GPU usage profile according to a GPU allocation mode will now be described.

FIG. 8 is a diagram illustrating resource distribution and latency when a network entity allocates a plurality of packages to a plurality of GPUs in a latency priority mode in a wireless communication system according to an embodiment of the disclosure.

It is assumed a case in which all GPUs capable of processing a package are used to obtain a latency gain.

Referring to FIG. 8, GPU1 to GPU4 may be allocated to package1 and package2 each consisting of 16 CTAs, and each of package1 and package2 may be divided in a unit of CTA and may be processed in GPU1 to GPU4.

For convenience of descriptions, assuming a case where workloads of package1 and package2 are equal and the workloads of the respective packages1 and 2 are equally applied to GPU1 to GPU4, in a case of FIG. 8, latency of each of the packages1 and 2 may be decreased to ¼, compared to a case of using one GPU. Compared to a case (shown in FIG. 10) where two GPUs are used and one package is applied to one GPU, latency of package1 may be decreased to ¼ and latency of package2 may be decreased to ½.

However, when four GPUs are used, power consumption is increased, compared to a case where one GPU is used or two GPUs are used.

Figure 9:
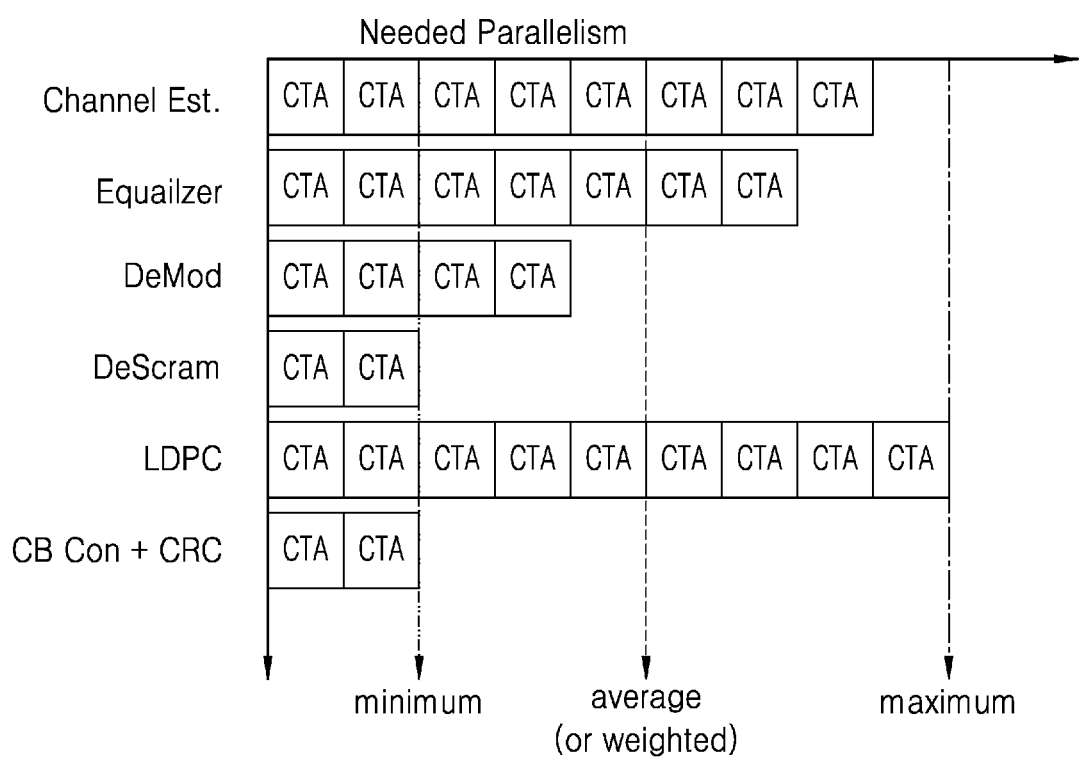
FIG. 9 is a diagram for describing a method by which a network entity determines the number of GPUs to be allocated to a software package in a latency priority mode in a wireless communication system according to an embodiment of the disclosure.

FIG. 9 is a diagram for describing a method by which a network entity determines the number of GPUs to be allocated to a software package in a latency priority mode in a wireless communication system according to an embodiment of the disclosure.

Referring to FIG. 9, modules constituting a software package may be parallelized, and parallelism of each module is performed in a unit of CTA. FIG. 9 illustrates parallelism of each of modules (e.g., Channel Estimation, Equalizing, DeModulation, DeScrambling, LDPC, and CB Con+CRC) of a physical uplink shared channel (PUSCH) of a vRAN package. Each of the modules has to be executed in order.

Modules of a physical downlink shared channel (PDSCH) may include, for example, Channel Estimation, Equalizer, DeModulation, DeScramble, LDPC, and CB Con+CRC, and it is assumed a case where Channel Estimation consists of 8 CTAs, Equalizing consists of 7 CTAs, DeModulation consists of 4 CTAs, DeScrambling consists of 2 CTAs, LDPC consists of 9 CTAs, and CB Con+CRC consists of 2 CTAs. In this case, a minimum and maximum of CTAs for processing a module are 2 CTAs and 9 CTAs, respectively, and an average of the CTAs is 5 CTAs.

According to an embodiment of the disclosure, the network entity may determine a needed parallelism to satisfy a latency requirement of each package, may determine the number of CTAs per SM, may determine a possible parallelism, and may determine the number of needed GPUs for a software package.

Hereinafter, each of operations of determining the number of needed GPUs for a software package in a latency priority mode will now be described with reference to FIG. 9.

1. Determination of Needed Parallelism

The needed parallelism may be determined according to configured conditions (for example, minimum (min.), maximum (max.), average, and weighted average).

In FIG. 9, the number of needed CTAs for each module, i.e., a level of needed parallelism, may vary. A CTA is a logical unit that is parallel-processible by a GPU. When the min. condition is applied to determine the needed parallelism, DeScram consisting of least CTAs is a reference, and thus, it is determined that needed parallelism=2. Alternatively, when the max. condition is applied to determine a needed parallelism, LDPC is a reference, and thus, it is determined that needed parallelism=9, for an average condition, an average of modules is determined as a needed parallelism, and for a weighted average condition, a weighted average obtained by respectively applying weights to the modules is determined as a needed parallelism. The respective weights for the modules are configurable parameters, and a total sum of the respective weights for the modules is 1.

2. Determination of the Number of CTAs Per SM

The number of CTAs per SM may also be determined according to configured conditions (for example, min., max, average, and weighted average). A parameter requested to determine the number of CTAs per SM may include a maximum number of threads per SM, a maximum number of CTAs per SM, a shared memory size, a usage of a register, and the like.

A needed parallelism refers to a logical number of CTAs that constitute a corresponding module, and the number of CTAs per SM refers to a unit that CTAs as many as the needed parallelism can be physically and simultaneously executed in a GPU. In this case, the needed parallelism may be defined as a parameter in the form of gridDim(x,y,z) with a Complete Unified Device Architecture (CUDA) code, whereas the number of CTAs per SM may be calculated by using a parameter (e.g., blockDim(x,y,z)) indicating how many threads constitute one CTA and a maximum number of threads which can be performed in an SM.

Therefore, the number of CTAs per SM may also vary for each of modules, and may be determined according to min., max, average, or weighted average.

The number of CTAs per SM indicates how many CTAs can be simultaneously executed in one SM, and an SM indicates hardware units that constitute a GPU.

The number of CTAs per SM may be determined as below.

The number of CTAs per SM=maximum number of threads in single SM/Size of blockDim(x,y,z)

According to an embodiment of the disclosure, in consideration of a shared memory usage amount and a register usage amount, the number of CTAs per SM may be further decreased.

Maximum number of threads in single SM may indicate the number of threads which can be maximally performed in one SM and may be determined according to GPU performance.

Size of blockDim(x,y,z) may indicate how many threads constitute one CTA and may be defined on the CUDA code.

3. Determination of Possible Parallelism

The possible parallelism may indicate how many CTAs can be simultaneously performed in one GPU and may be determined as below.

Possible Parallelism=$\theta_{avail}$*total SMs in single GPU (hardware spec)*the number of CTAs per SM Where, $\theta_{avail}$ indicates an SM usage ratio that is a ratio (0<$\theta_{avail}$<1) indicating how many SMs are to be used from among all SMs constituting a GPU. When a value of $\theta_{avail}$ is small, this corresponds to a case where one GPU uses a small number of SMs, and thus, processes vRAN in a latency priority mode. $\theta_{avail}$ is a parameter that is configurable by a system.

4. Determination of the Number of Needed GPUs for Package

A needed parallelism indicates the number of CTAs constituting one module of a vRAN package. Here, each of modules has to be processed in order or sequentially, and thus, the number of needed GPUs cannot be obtained by multiplying the number of modules.

According to an embodiment of the disclosure, the number of needed GPUs may be determined by dividing a needed parallelism by a possible parallelism (the number of needed CTAs for a module/the number of CTAs that can be simultaneously performed in one GPU). Therefore, the number of needed GPUs may be determined as below.

the number of needed GPUs=Ceil(Needed Parallelism/Possible Parallelism)

For example, in a case where a total of SMs in single GPU is 80, the number of CTAs per SM is 12, $\theta_{avail}$=0.1, and a needed parallelism is 256, the number of GPUs is determined as below.

the number of GPUs=Ceil[256/(0.1*80*12)]=ceil (2.6666 . . . )=3

When the number of GPUs is determined, the network entity may determine GPUs to be respectively allocated to a plurality of software packages and may determine a usage ratio of each of the GPUs.

According to an embodiment of the disclosure, in order to reduce power consumption as much as possible, the network entity may priorly allocate a GPU having an unused core from among GPUs that currently operate. For, the network entity may determine, based on $\theta_{empty}$, a GPU to be allocated to a software package and a usage ratio of each of GPUs. $\theta_{empty}$ indicates a percentage of an SM to which each of cells is not allocated in one GPU, and in this regard, when $\theta_{empty}$ is 1, a GPU is not allocated, and when $\theta_{empty}$ is 0, a GPU is 100% used. The network entity priorly allocates a CTA to an SM of a GPU where $\theta_{empty}$ is not 1 from among GPUs currently performing other package, and determines a percentage of a GPU to be allocated to a package, based on $\theta_{empty}$. When only a certain percentage of the GPU is allocated to the package, additional allocation of the GPU may be requested.

According to an embodiment of the disclosure, in order to allow a standby time for sequentially processing each of modules to be minimum so as to decrease a required processing time of a package as much as possible, the network entity may determine a GPU to be allocated to the package, in consideration of a processing completion time of each of the modules.

FIG. 10 is a diagram illustrating resource distribution and latency when a network entity allocates a plurality of packages to a plurality of GPUs in a power priority mode in a wireless communication system according to an embodiment of the disclosure.

It is assumed a case in which some GPUs of all GPUs capable of processing a package are used to obtain a power gain.

Referring to FIG. 10, GPU1 and GPU2 may be used to process package1 and package2 each consisting of 16 CTAs, and in this regard, package1 may be processed in GPU1 and package2 may be processed in GPU2.

In this case, compared to an embodiment of FIG. 8, latency of package1 is increased by four times and latency of package2 is increased by two times, but, because the number of used GPUs is decreased, a gain in power (energy) consumption may be obtained. Also, in this case, when processing speeds of package1 and package2 are different, a GPU having first completed package processing may enter a standby mode, and thus, an additional power gain may be expected.

According to another embodiment of the disclosure, in a case where package1 and package2 are divided and are processed in GPU1 and GPU2, a latency gain may be obtained, compared to an embodiment of FIG. 10. However, in this case, after processing of package1 is completed, package2 is processed, such that, even when processing speeds of package1 and package2 are different, GPU1 and GPU2 have to operate until processing of package1 and package2 is completed.

In the power priority mode, minimization of power consumption has a priority, and thus, the network entity may determine a GPU usage profile to maximally use a power-on GPU.

According to an embodiment of the disclosure, the network entity in the power priority mode may perform, as in a latency priority mode, 1. an operation of determining a needed parallelism, and 2. an operation of determining the number of CTAs per SM.

Afterward, the network entity (a GPU scheduler) allocates a GPU according to $\theta_{empty}$ being monitored.

$\theta_{empty}$ indicates a percentage of an SM to which each of cells is not allocated in one GPU (unused SMs/total SMs), and has a relation below.

$$1=\theta_{avail\_cell1}+\theta_{avail\_cell2}+\theta_{avail\_cell3}+\ldots\theta_{empty}$$

When $\theta_{empty}$ is 1, a GPU is not allocated, and when $\theta_{empty}$ is 0, a GPU is 100% used.

The network entity priorly allocates a CTA to an SM of a GPU where $\theta_{empty}$ is not 1 from among GPUs currently performing other packages. Afterward, when it is required to additionally allocate more GPUs, 3. the network entity may allocate a new GPU by configuring $\theta_{avail}=1$ in a process of determining a possible parallelism.

Figure 11:
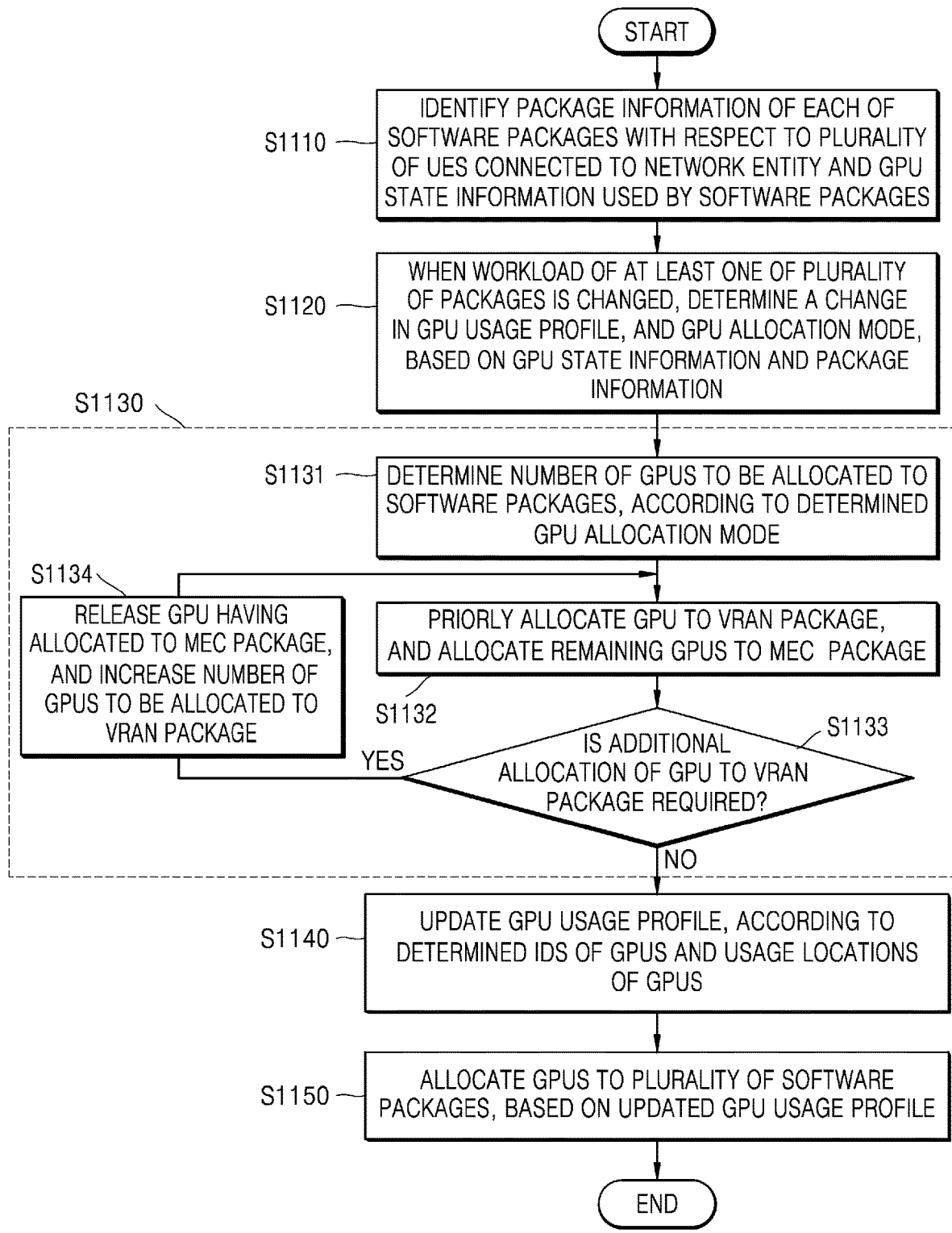
FIG. 11 is a flowchart of a method by which a network entity determines a GPU usage profile of software packages in a wireless communication system according to an embodiment of the disclosure.

FIG. 11 is a flowchart of a method by which a network entity determines a GPU usage profile of software packages in a wireless communication system according to an embodiment of the disclosure.

According to an embodiment of the disclosure, the network entity may allocate a GPU to a vRAN package in priority over other packages, i.e., may allow the vRAN package to preempt the GPU.

In a normal case, a maximum available processing time (T_latency) of the vRAN package is short, and processing of the vRAN package has to precede processing of other package, such that priority is given to the vRAN package.

Referring to FIG. 11, detailed descriptions that are redundant to those of FIGS. 4 and 7 are not provided.

In operation S1110, the network entity may identify package information of each of the software packages with respect to a plurality of UEs connected to the network entity and GPU state information used by the software packages.

The package information may include information of at least one BS processed by a software package, a workload of modules constituting each of the software packages, i.e., GPU usage amount information and requirement of each software package, and the GPU state information may include information about use or non-use of each of GPUs constituting a GPU cluster, a core usage amount, a GPU operation ratio, a GPU usage location (information of a sector being used, SM information, or the like), and power consumption. However, the examples above are merely an example, and the package information or the GPU state information is not limited to the examples.

Each of packages may periodically deliver the package information or deliver the package information in response to occurrence of a preset event to the GPU scheduler, and the network entity may monitor GPU usage states of the respective packages, based on the package information. Also, the network entity may collect a plurality of pieces of resource information included in a plurality of pieces of the package information, thereby separately managing GPU usage information used by all packages. The GPU usage information may include, for example, information about an allocation state with respect to a package, use or non-use, a core load state, the number of processing cycles per core, or the like about each of GPUs.

In operation S1120, when a workload of at least one of a plurality of packages is changed, the network entity may determine a change in a GPU usage profile, and the GPU allocation mode, based on the package information and the GPU state information.

The GPU usage profile of each of the software packages may include information about the number of at least one GPU used by each of the software packages (or, allocated to each of the software packages), ID information of the at least one GPU (e.g., ID of the at least one GPU) used by each of the software packages, a usage ratio (e.g., a core usage ratio) of the at least one GPU used by each of the software packages, and an allocation location (e.g., sector information, SM information, or the like) of the at least one GPU used by each of the software packages.

When it is determined to change the GPU usage profile, the network entity may determine a GPU allocation mode. The network entity may determine the GPU allocation mode by comparing a processing time of each of the plurality of software packages with a preset threshold value (a package latency requirement) or comparing power consumption by GPUs with a preset threshold value (a power requirement).

A detailed method of determining whether to change a GPU usage profile is described in operation S420 of FIG. 4, and a detailed method of determining a GPU allocation mode is described in operation S720 of FIG. 7, and thus, detailed descriptions thereof are not provided here.

In operation S1130, the network entity may determine the number of packages to process a workload, IDs of GPUs to be allocated to the packages, and usage locations of the GPUs, based on the package information and the GPU state information.

In operation S1131, the network entity may determine the number of GPUs to be allocated to software packages, according to the GPU allocation mode determined in operation S1120.

In operation S1132, the network entity may priorly allocate a GPU to a vRAN package, and may allocate remaining GPUs to an MEC package.

That is, a GPU may be allocated to the vRAN package in a preemptive scheme, and GPUs may be allocated to the MEC package (and a UPF package) in a non-preemptive scheme. The network entity may use two types of an algorithm to allow the vRAN package to preempt a GPU. The first type involves determining a multi-GPU to be consistently allocated to the MEC package, and the second type involves using a buffer GPU. In operation S1133, the network entity determines whether it is required to additionally allocate a GPU to the vRAN package.

In operation S1133, when it is determined that additional allocation of a GPU to the vRAN package is required, in operation S1134, the network entity may release a GPU having allocated to the MEC package, and may increase, in a GPU usage profile of the vRAN package, the number of GPUs to be used by the vRAN package. Afterward, again, the network entity may priorly allocate GPUs to the vRAN package, and may allocate a remaining GPU to the MEC package.

In operation S1140, the network entity may update the GPU usage profile, according to the determined IDs of the GPUs and the determined usage locations of the GPUs.

In operation S1150, the network entity may allocate the GPUs to the plurality of software packages, based on the updated GPU usage profile.

Operation S1140 and operation S1150 are described in operation S440 and operation S450 of FIG. 4, and thus, detailed descriptions thereof are not provided here.

Figure 12:
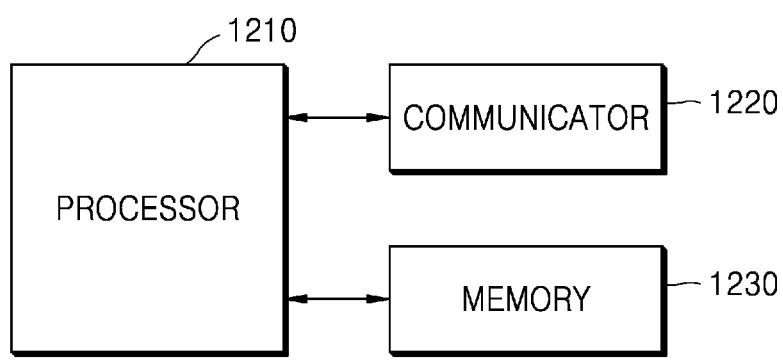
FIG. 12 is a block diagram of a network entity in a wireless communication system according to an embodiment of the disclosure.

FIG. 12 is a block diagram of a network entity in a wireless communication system according to an embodiment of the disclosure.

Referring to FIG. 12, the network entity according to the disclosure may be a data transmitting apparatus including a processor 1210, a communicator 1220, a memory 1230, and an interface unit 1240.

However, components of the data transmitting apparatus are not limited to the above example. For example, the data transmitting apparatus may include more or fewer components than the afore-described components. Also, the processor 1210, the communicator 1220, the memory 1230, and the interface unit 1240 may be implemented as one chip. Only components related to an embodiment are illustrated in the data transmitting apparatus of FIG. 12. Therefore, one of ordinary skill in the art may understand that there may be other general-use components in addition to the components shown in FIG. 12.

The processor 1210 may control a series of processes for transmitting data (e.g., a packet), which are described with reference to FIGS. 1, 2, 3, 4, 5, 6A, 6B, 7, 8, 9, 10, and 11. In more detail, the processor 1210 may determine whether to generate a software package, whether to change a GPU usage profile with respect to software packages, and a GPU allocation mode, may determine a GPU usage profile, and may allocate a GPU to the software package according to the GPU usage profile. The processor 1210 may refer to a plurality of processors, and may perform the afore-described retransmitting operation by executing a plurality of instructions (or, a program) stored in the memory 1230.

According to an embodiment of the disclosure, the processor 1210 may control a series of processes in which the network entity can operate, which are illustrated in FIGS. 1, 2, 3, 4, 5, 6A, 6B, 7, 8, 9, 10, and 11. For example, the network entity may be implemented as a plurality of instructions (or, a program). The processor 1210 may perform operations of the network entity by executing the plurality of instructions (or, the program).

Also, the processor 1210 may control generation functions to control the network entity. For example, the processor 1210 may generally control the data transmitting apparatus by executing programs stored in the memory 1230 in the data transmitting apparatus. The processor 1210 may be implemented as a CPU, a GPU, an application processor (AP), or the like arranged in the data transmitting apparatus, but is not limited thereto.

The communicator 1220 may connect the network entity with another device by using a wired/wireless communication module, and may transmit or receive data.

The communicator 1220 may transmit or receive a signal to or from an external device (e.g., a UE), a network (e.g., a core network) or another data transmitting apparatus (e.g., a cell group). The signal transmitted or received to or from the communicator 1220 may include control information and data. The communicator 1220 may include a RF transmitter for up-converting and amplifying a frequency of a signal to be transmitted, and an RF receiver for low-noise amplifying and down-converting a frequency of a received signal. However, this is merely an example of the communicator 1220, and components of the communicator 1220 are not limited to the RF transmitter and the RF receiver.

Also, the communicator 1220 may receive signals through wireless channels and output the signals to the processor 1210, and may transmit signals output from the processor 1210, through wireless channels.

According to an embodiment of the disclosure, the communicator 1220 may transmit or receive data to or from the external device, the network, or the other data transmitting apparatus, in response to control by the processor 1210.

The memory 1230 may refer to hardware to store various data processed by the data transmitting apparatus, and for example, may store a plurality of pieces of data received by the communicator 1220, a plurality of pieces of processed data, and a plurality of pieces of data to be processed.

According to an embodiment of the disclosure, the memory 1230 may store a plurality of instructions (or, a program) and data which are required for operations of the data transmitting apparatus. Also, the memory 1230 may store control information or data included in a signal transmitted or received to or from the data transmitting apparatus. The memory 1230 may be implemented as a storage medium including a read only memory (ROM), a random access memory (RAM), a hard disk, a compact disc (CD)-ROM, a digital versatile disc (DVD), or the like, or any combination thereof. Also, the memory 1230 may refer to a plurality of memories.

The interface unit 1240 may transmit or receive data and commands for interoperations between components in the data transmitting apparatus.

Components in a block diagram may be combined, a component may be added thereto, or at least one of the components may be omitted according to specifications of an apparatus to be actually embodied. That is, at least two components may be combined to one component, or one component may be divided into two components when necessary. Also, functions performed by each component are for describing the embodiments of the disclosure, and detailed operations or devices do not limit the scope of the disclosure.

The methods according to the embodiments of the disclosure as described herein or in the following claims may be implemented as hardware, software, or a combination of hardware and software.

When implemented as software, a computer-readable storage medium storing one or more programs (e.g., software modules) may be provided. The one or more programs stored in the computer-readable storage medium are configured for execution by one or more processors in an electronic device. The one or more programs include instructions directing the electronic device to execute the methods according to the embodiments of the disclosure as described herein or in the following claims.

The programs (e.g., software modules or software) may be stored in non-volatile memory including random access memory (RAM) or flash memory, read only memory (ROM), electrically erasable programmable read only memory (EEPROM), a magnetic disc storage device, a compact disc (CD)-ROM, a digital versatile disc (DVD), another optical storage device, or a magnetic cassette. Alternatively, the programs may be stored in memory including a combination of some or all of the above-mentioned storage media. A plurality of such memories may be included.

In addition, the programs may be stored in an attachable storage device accessible via any or a combination of communication networks such as Internet, an intranet, a local area network (LAN), a wide LAN (WLAN), a storage area network (SAN), or the like. The storage device may access, via an external port, a device performing the embodiments of the disclosure. Furthermore, a separate storage device on the communication network may access the electronic device performing the embodiments of the disclosure.

It should be understood that the embodiments of the disclosure in the specification and drawings should be considered in a descriptive sense only and not for purposes of limitation. That is, it will be understood by one of ordinary skill in the art that various modifications in form and details may be made based on the technical concept of the disclosure. Also, the embodiments of the disclosure may be combined to be implemented, when required. For example, the BS and the UE may be operated in a manner that portions of an embodiment of the disclosure are combined with portions of another embodiment of the disclosure. Also, modifications based on the technical scope of the embodiments of the disclosure may be applied to various systems such as a Frequency Division Duplex (FDD) LTE system, a Time Division Duplex (TDD) LTE system, a 5G or NR system, or the like.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A method, performed by a network entity, of executing a software package in a wireless communication system, the method comprising:
   identifying package information of each of a plurality of software packages and graphics processing unit (GPU) state information used by the plurality of software packages with respect to a plurality of user equipments (UEs) connected to the network entity;
   when a workload of at least one of the plurality of software packages is changed, determining to change a GPU usage profile, based on the package information and the GPU state information;
   determining a number of software packages to process the workload, identifications (IDs) of GPUs to be allocated to the determined software packages, and usage locations of the GPUs, based on the package information and the GPU state information;
   updating the GPU usage profile, according to the determined IDs of the GPUs and the determined usage locations of the GPUs; and
   allocating the GPUs to the plurality of software packages, based on the updated GPU usage profile.

2. The method of claim 1,
   wherein the package information comprises information about a computation amount and a GPU usage amount and information about a package latency requirement of each of the plurality of software packages,
   wherein the GPU state information comprises information about use or non-use, a usage amount, a usage location, and power consumption of a GPU, and
   wherein the GPU usage profile comprises information about a number of GPUs used by a software package, IDs of the GPUs, a usage ratio of each of the GPUs, and a usage location of each of the GPUs.

3. The method of claim 2, wherein the determining to change the GPU usage profile comprises comparing the package latency requirement with a processing time of the software package.

4. The method of claim 2, wherein the determining to change the GPU usage profile comprises comparing the power consumption of the GPU with a power consumption requirement of a system.

5. The method of claim 1,
   wherein the determining to change the GPU usage profile comprises determining a GPU allocation mode, and
   wherein the GPU allocation mode comprises a latency priority mode or a power priority mode.

6. The method of claim 5, further comprising:
   determining the GPU allocation mode based on a factor that has a greater effect on operation of a system from among latency or power consumption; and
   determining a number of GPUs to be allocated to each package, based on the GPU allocation mode.

7. The method of claim 1, wherein the determining of the IDs of the GPUs and the usage locations of the GPUs comprises:
   determining a number of GPUs to be allocated to each of the plurality of software packages; and
   according to the determined number of GPUs, determining IDs and usage ratios of the GPUs to be respectively allocated to the plurality of software packages.

8. The method of claim 1, wherein the determining of the IDs of the GPUs and the usage locations of the GPUs comprises, based on the package information, determining GPU allocation priorities among the plurality of software packages.

9. The method of claim 1, wherein the determining of the IDs of the GPUs and the usage locations of the GPUs comprises, based on the GPU state information, determining allocation priorities among the GPUs.

10. The method of claim 1, wherein the software packages perform at least one of a virtualized radio access network (vRAN) function, a mobile edge computing (MEC) function, or a user plane function (UPF).

11. The method of claim 1, wherein a component management (CM) package obtains hardware usage information about all software packages included in a server.

12. The method of claim 1,
    wherein a GPU comprises a virtualized hardware resource, and
    wherein a preset percentage or computation amount of each hardware resource is used to process a task of a particular software package.

13. A non-transitory computer-readable recording medium having recorded thereon a program for performing the method of claim 1, on a computer.

14. A network entity for executing a software package in a wireless communication system, the network entity comprising:
    a communicator;
    a memory storing a plurality of instructions; and
    at least one processor configured to execute the plurality of instructions to:
       identify package information of each of a plurality of software packages and graphics processing unit (GPU) state information used by the plurality of software packages with respect to a plurality of user equipments (UEs) connected to the network entity,
       when a workload of at least one of the plurality of software packages is changed, determine to change a GPU usage profile, based on the package information and the GPU state information,
       determine a number of software packages to process the workload, identifications (IDs) of GPUs to be allocated to the determined software packages, and usage locations of the GPUs, based on the package information and the GPU state information,
       update the GPU usage profile, according to the determined IDs of the GPUs and the determined usage locations of the GPUs, and
       allocate the GPUs to the plurality of software packages, based on the updated GPU usage profile.

15. The network entity of claim 14,
    wherein the package information comprises information about a computation amount and a GPU usage amount and information about a package latency requirement of each of the plurality of software packages,
    wherein the GPU state information comprises information about use or non-use, a usage amount, a usage location, and power consumption of a GPU, and wherein the GPU usage profile comprises information about a number of GPUs used by a software package, IDs of the GPUs, a usage ratio of each of the GPUs, and a usage location of each of the GPUs.

16. The network entity of claim 14,
wherein the at least one processor is further configured to execute the plurality of instructions to determine a GPU allocation mode so as to determine whether to change the GPU usage profile, and
wherein the GPU allocation mode comprises a latency priority mode or a power priority mode.

17. The network entity of claim 15, wherein the at least one processor is further configured to execute the plurality of instructions to determine whether to change the GPU usage profile, by comparing the package latency requirement with a processing time of the software package.

18. The network entity of claim 15, wherein the at least one processor is further configured to execute the plurality of instructions to determine whether to change the GPU usage profile, by comparing the power consumption of the GPU with a power consumption requirement of a system.

19. The network entity of claim 14, wherein the at least one processor is further configured to:
execute the plurality of instructions to, in order to determine the IDs of the GPUs and the usage locations of the GPUs;
determine a number of GPUs to be allocated to each of the plurality of software packages; and
according to the determined number of GPUs, determine IDs and usage ratios of the GPUs to be respectively allocated to the plurality of software packages.

20. The network entity of claim 14, wherein the at least one processor is further configured to:
execute the plurality of instructions to, in order to determine the IDs of the GPUs and the usage locations of the GPUs; and
determine GPU allocation priorities among the plurality of software packages, based on the package information.

21. The network entity of claim 14, wherein the at least one processor is further configured to:
execute the plurality of instructions to, in order to determine the IDs of the GPUs and the usage locations of the GPUs; and
determine allocation priorities among the GPUs, based on the GPU state information.

* * * * *